(12) United States Patent
Kita et al.

(10) Patent No.: US 12,729,955 B2
(45) Date of Patent: Sep. 8, 2026

(54) OPTICAL DEVICE AND INSPECTION METHOD

(71) Applicant: NIKON CORPORATION, Tokyo (JP)

(72) Inventors: Naonori Kita, Tokyo (JP); Masanori Arai, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 117 days.

(21) Appl. No.: 18/725,564

(22) PCT Filed: Dec. 28, 2021

(86) PCT No.: PCT/JP2021/048971

§ 371 (c)(1), (2) Date: Jun. 28, 2024

(87) PCT Pub. No.: WO2023/127152

PCT Pub. Date: Jul. 6, 2023

(65) Prior Publication Data

US 2025/0155236 A1 May 15, 2025

(51) Int. Cl.
*G01B 11/24* (2006.01)

(52) U.S. Cl.
CPC ................................ *G01B 11/2408* (2013.01)

(58) Field of Classification Search
CPC ... G01B 11/2408; G01B 11/30; G01N 21/956
See application file for complete search history.

(56) References Cited

U.S. PATENT DOCUMENTS 5,404,247 A 4/1995 Cobb et al.
8,842,271 B2 9/2014 Meyer et al.
2002/0051564 A1* 5/2002 Benesch ............. G03F 7/70491 382/156
2005/0219548 A1 10/2005 Muroya
2013/0083306 A1* 4/2013 Smirnov ............. G03F 7/70625 356/625

(Continued)

FOREIGN PATENT DOCUMENTS

JP S47-028949 A 11/1972
JP S62-235511 A 10/1987

(Continued)

OTHER PUBLICATIONS

WO2020217338A1—translation with page numbers (Year: 2020).*

(Continued)

*Primary Examiner* — Tarifur R Chowdhury
*Assistant Examiner* — Carlos Perez-Guzman
(74) *Attorney, Agent, or Firm* — Oliff PLC

(57) ABSTRACT

An optical device for inspecting a to-be-inspected surface having a riblet structure in which projections each extending in a first direction are provided in a second direction intersecting the first direction is configured to include a condensing optical system that irradiates an irradiation region on the to-be-inspected surface with light from a light source and that condenses light reflected by the irradiation region; and a photodetector that has a photosensitive surface disposed on a plane different from a plane conjugate to the to-be-inspected surface with respect to the condensing optical system, and that detects intensity distribution of the light condensed by the condensing optical system.

28 Claims, 12 Drawing Sheets

(56) References Cited

U.S. PATENT DOCUMENTS

| | | | | |
|---|---|---|---|---|
| 2014/0362369 | A1 | 12/2014 | Hotta et al. | |
| 2017/0108444 | A1* | 4/2017 | Otani | G01B 11/2513 |
| 2023/0160835 | A1* | 5/2023 | Arima | G01N 21/8851 |

FOREIGN PATENT DOCUMENTS

| | | | | |
|---|---|---|---|---|
| JP | 2004-301619 | A | 10/2004 | |
| JP | 2005-291859 | A | 10/2005 | |
| JP | 2008-032669 | A | 2/2008 | |
| JP | 2008-085252 | A | 4/2008 | |
| JP | 2014-240782 | A | 12/2014 | |
| WO | WO-2020217338 | A1 * | 10/2020 | G01N 21/95 |

OTHER PUBLICATIONS

Mar. 1, 2022 International Search Report issued in International Patent Application No. PCT/JP2021/048971.

Mar. 1, 2022 Written Opinion issued in International Patent Application No. PCT/JP2021/048971.

Sep. 1, 25, 2025 Search Report issued in European Patent Application No. 21970032.5.

Feb. 3, 2026 Office Action issued in Japanese Patent Application No. 2023-570624.

Jul. 7, 2026 Office Action issued in Japanese Patent Application No. 2023-570624.

Moriyama et al. "Development of surface shaping technology for improving the efficiency fo energy utilization", Kumamoto Industrial Technology Center Report No. 53, Mar. 2017, pp. 1-5.

* cited by examiner

OPTICAL DEVICE AND INSPECTION METHOD

FIELD

The present disclosure relates to an optical device and an inspection method used for inspecting an object surface having a riblet structure.

BACKGROUND

Configurations of an inspection device for inspecting the quality of a fine structure have been proposed (see, e.g., Patent Literature 1).

CITATION LIST

Patent Literature

Patent Literature 1: U.S. Pat. No. 8,842,271

SUMMARY

An optical device according to the present disclosure is an optical device for inspecting a to-be-inspected surface having a riblet structure in which projections each extending in a first direction are provided in a second direction intersecting the first direction. The optical device includes a condensing optical system that irradiates an irradiation region on the to-be-inspected surface with light from a light source and that condenses light reflected by the irradiation region; and a photodetector that has a photosensitive surface disposed on a plane different from a plane conjugate to the to-be-inspected surface with respect to the condensing optical system, and that detects intensity distribution of the light condensed by the condensing optical system.

An inspection method according to the present disclosure is an inspection method for inspecting a to-be-inspected surface having a riblet structure in which projections each extending in a first direction are provided in a second direction intersecting the first direction. The inspection method includes irradiating an irradiation region on the to-be-inspected surface with light; condensing, with a condensing optical system, light reflected by the irradiation region in response to irradiation with the light; receiving the condensed light on a plane different from a plane conjugate to the to-be-inspected surface with respect to the condensing optical system; and inspecting the riblet structure, based on the result of reception of light.

BRIEF DESCRIPTION OF DRAWINGS

FIG. 1 schematically illustrates irradiation of an object surface having a riblet structure with light.

FIG. 3 illustrates reflection of light on an object surface having a riblet structure.

FIG. 6 illustrates a relationship of projection in the condensing optical system.

DESCRIPTION OF EMBODIMENTS

An optical device and an inspection method of the present application will now be described in detail with reference to the attached drawings.

Figure 1:
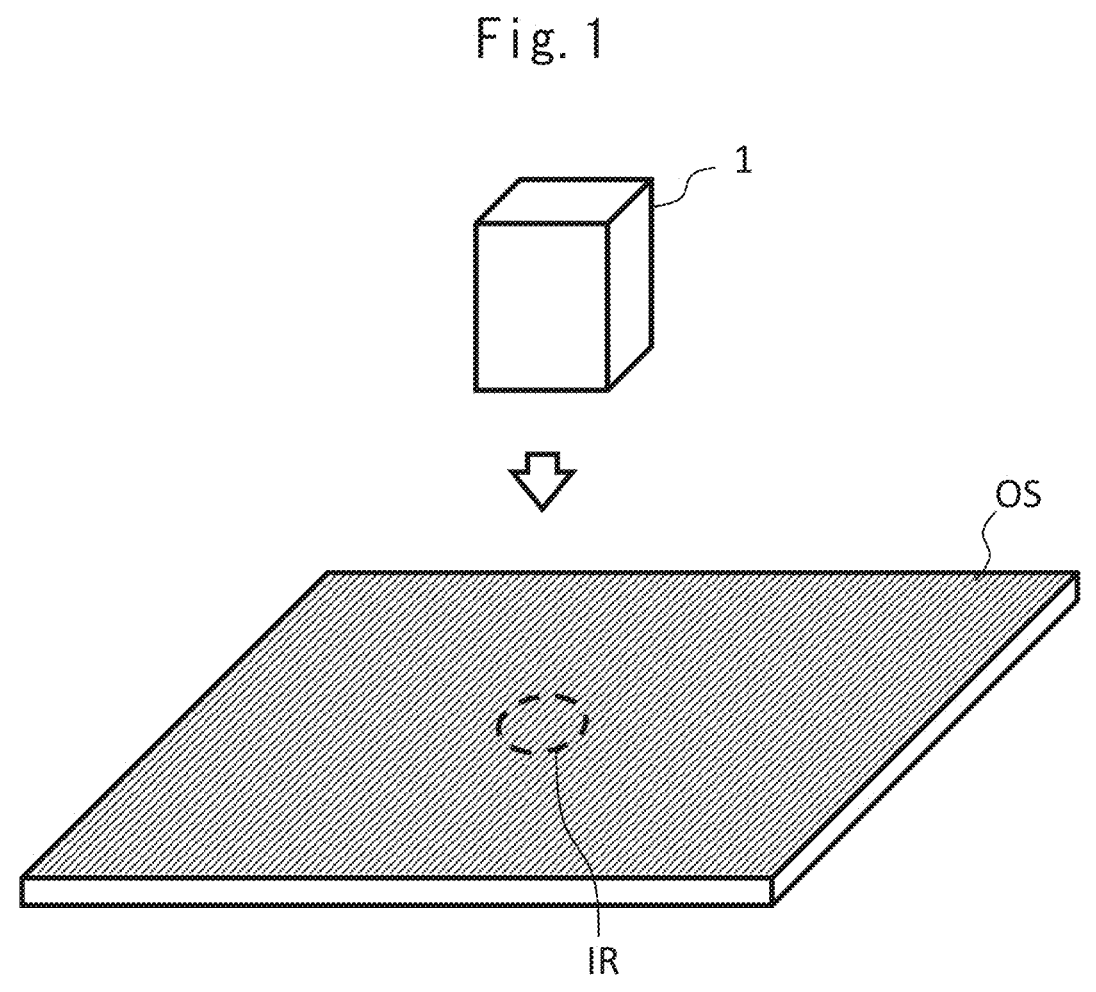
Figure 2:
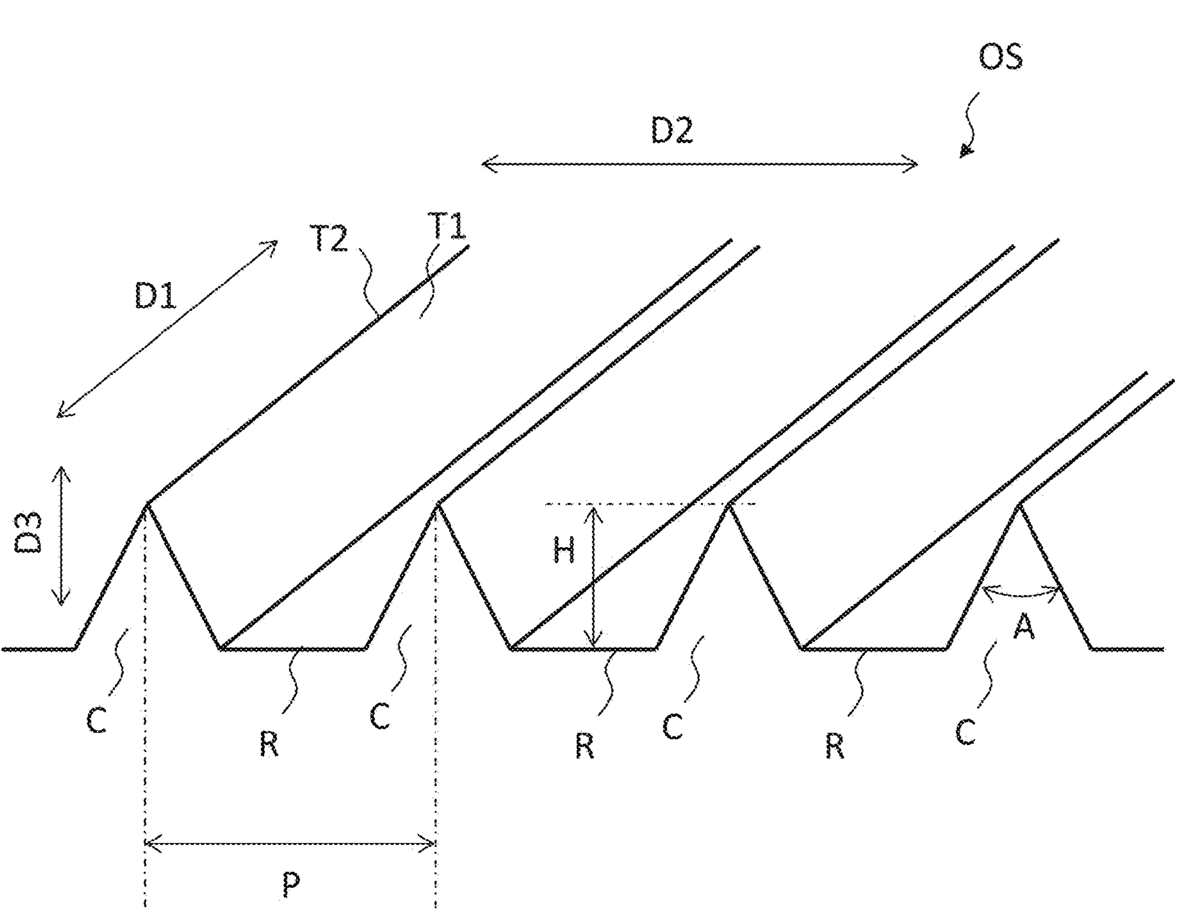
FIG. 2 illustrates a riblet structure.

FIG. 1 schematically illustrates irradiation of an object surface having a riblet structure with light, and FIG. 2 illustrates a riblet structure.

In the present embodiment, an optical device 1 is located a predetermined distance away from an object surface OS having a riblet structure formed thereon, and inspects the object surface OS by irradiating an irradiation region IR on the object surface OS with light. For convenience of description, the following describes a case in which the optical device 1 is used for inspecting a riblet structure (object surface OS), but the optical device 1 can also be applied to measurement of a riblet structure (object surface OS). For illustrative purposes, FIG. 1 shows the optical device 1 disposed farther from the object surface OS than a predetermined position. The object surface OS may be an envelope including ridgelines of riblet or a surface of an object on which a riblet structure will be formed. The object surface OS may be referred to as a surface of a workpiece.

Formation of a riblet structure on an object surface OS enables reduction in frictional resistance between the object surface OS and a fluid contacting the object surface OS. However, a change in the shape of the riblet structure may reduce the effect of reduction in frictional resistance between the object surface OS and a fluid. Thus, an optical device for inspecting the shape of a riblet structure on an object surface OS conveniently is desired. It may be said that at least part of an object surface OS is a to-be-inspected surface, and that at least part of a riblet structure formed on an object surface OS is a to-be-inspected surface. A fluid contacting an object surface OS may be a gas or a liquid.

On the object surface OS, projections C each projecting outside the object and extending in a first direction D1 are provided in a second direction D2. The second direction D2 intersects the first direction D1, and is, for example, perpendicular to the first direction D1 in the object surface OS. In regions R on the object surface OS, the projections C are not provided. It may also be said that a region R is a region on the object surface OS between projections C adjacent in the second direction D2, and that the riblet structure is a structure including the projections C and the regions R, or a structure of only the projections C. Projections C adjacent in the second direction D2 may abut each other. In other words, the regions R may be omitted.

The riblet structure (object surface OS) may be formed, for example, by removing portions other than the projections C from a surface of a workpiece (e.g., metal) by laser machining. The riblet structure (object surface OS) may be formed by fixing (e.g., bonding) a resin film (e.g., UV-curable resin) having a riblet structure formed thereon to a surface of a workpiece. The riblet structure may be formed by applying a curable material (e.g., UV-curable resin) to a surface of a workpiece and pressing a die having a shape corresponding to the riblet structure against a material layer on the workpiece. FIG. 1 shows an example of an object surface OS having a riblet structure formed on a flat surface of a workpiece, but the workpiece may have a curved surface. When the riblet structure is formed by pressing a die against a material layer on a workpiece, the die pressed against the material layer (e.g., the shape of the die on the side pressed against the material layer) may be inspected and/or measured with the optical device 1.

The projections C each have a pair of slopes T1 and T2, which may be collectively referred to as "slopes T" below, inclined with respect to a third direction D3. The third direction D3 is perpendicular to the first direction D1 and the second direction D2, and is, for example, the normal direction of the object surface OS. The designed slopes T1 and T2 are assumed to be symmetrical about the third direction D3. In other words, the angle formed between one slope T1 and the regions R equals the angle formed between the other slope T2 and the regions R, in design terms. It may also be said that the designed slopes T1 and T2 are symmetrical about the third direction D3. The designed slopes T1 and T2 may be asymmetrical about the third direction D3. The third direction D3 may be a direction intersecting the first direction D1 and the second direction D2.

The pitch P of the projections C provided in the second direction D2 may be, for example, 100 μm. The size in the third direction D3 (height H) of the projections C may be, for example, 50 μm. A pair of slopes T1 and T2 inclines with respect to the third direction D3, for example, by ±22.5°, and the apical angle A of the projections C may be, for example, 45°. The pitch P of the projections C, the size in the third direction D3 (height H) of the projections C, the angle of inclination of slopes T1 and T2 relative to the third direction D3, and the apical angle A of the projections C are not limited to the above values.

An object surface having such a riblet structure formed thereon is described, for example, in U.S. Pat. Nos. 8,444,092, 9,656,743, 8,876,052, 9,751,618, and 10877377, and U.S. Patent Application Publications Nos. 2013/0146217, 2016/0271930, 2020/0263704, and 2021/0054859.

Figure 3:
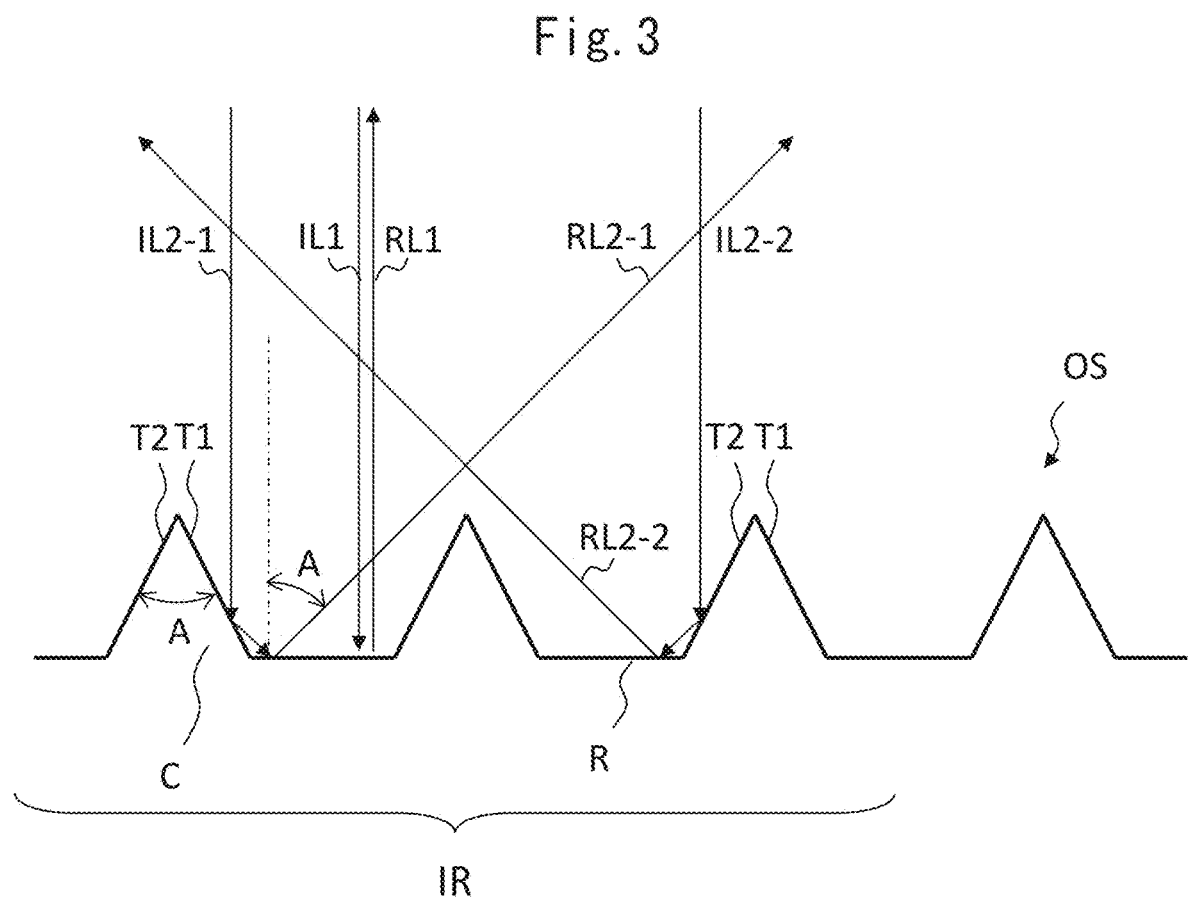

FIG. 3 illustrates reflection of light on the object surface OS.

Incident light IL1, IL2-1, and IL2-2 incident in parallel in the normal direction of the object surface OS is radiated to the irradiation region IR on the object surface OS and reflected by the irradiation region IR.

First reflected light RL1 results from the incident light IL1 being reflected once by the regions R of the object surface OS. In the example of FIG. 3, a first reflection direction in which the first reflected light RL1 is reflected from the irradiation region IR is perpendicular to the regions R of the object surface OS. The first reflected light RL1 may include reflected light that results from incident light entering the irradiation region IR at a position different from the position of entry of the incident light IL1 and being reflected once by the regions R.

Second reflected light RL2-1 and RL2-2, which may be collectively referred to as "second reflected light RL2" below, results from the incident light IL2-1 and IL2-2 entering the irradiation region IR at different positions and being reflected at least once by the regions R and the projections C.

For example, the second reflected light RL2-1 results from the incident light IL2-1 being reflected at least once by both the regions R and the slopes T1 of the projections C, i.e., at least twice by the irradiation region IR. The second reflected light RL2-2 results from the incident light IL2-2 entering at a position different from the position of entry of the incident light IL2-1 and being reflected at least once by both the regions R and the slopes T2 of the projections C, i.e., at least twice by the irradiation region IR.

The reflection direction of the second reflected light RL2-1 reflected by the slopes T1 of the projections C having an apical angle A and the regions R (hereafter a "second reflection direction") is inclined by the same angle as the apical angle A from the normal direction of the regions R of the object surface OS. The apical angle A may differ from a designed apical angle of the riblet structure. In other words, the second reflection direction may be inclined from the normal direction of the regions R by an angle different from the designed apical angle.

The reflection direction of the second reflected light RL2-2 reflected by the slopes T2 of the projections C having an apical angle A and the regions R (hereafter a "third reflection direction") is inclined by the same angle as the apical angle A in the direction opposite to the second reflection direction with respect to the normal direction of the regions R of the object surface OS. The apical angle A may differ from the designed apical angle of the riblet structure. In other words, the third reflection direction may be inclined by an angle different from the designed apical angle in the direction opposite to the second reflection direction with respect to the normal direction of the regions R.

The second reflected light RL2-1 and RL2-2 may be light reflected three or more times by the regions R and the projections C, e.g., reflected once by the regions R and twice by the projections C. In addition to the second reflected light RL2-1 and RL2-2, the second reflected light RL2 may include reflected light that results from incident light entering the irradiation region IR at a position different from the positions of entry of the incident light IL2-1 and IL2-2 and being reflected at least twice by the irradiation region IR.

The projections C may have a height H (e.g., 50 μm), and a pair of slopes T1 and T2 may form an apical angle A (e.g., 45°).

Figure 4:
FIG. 4 schematically illustrates the configuration of an optical device.
Figure 4:
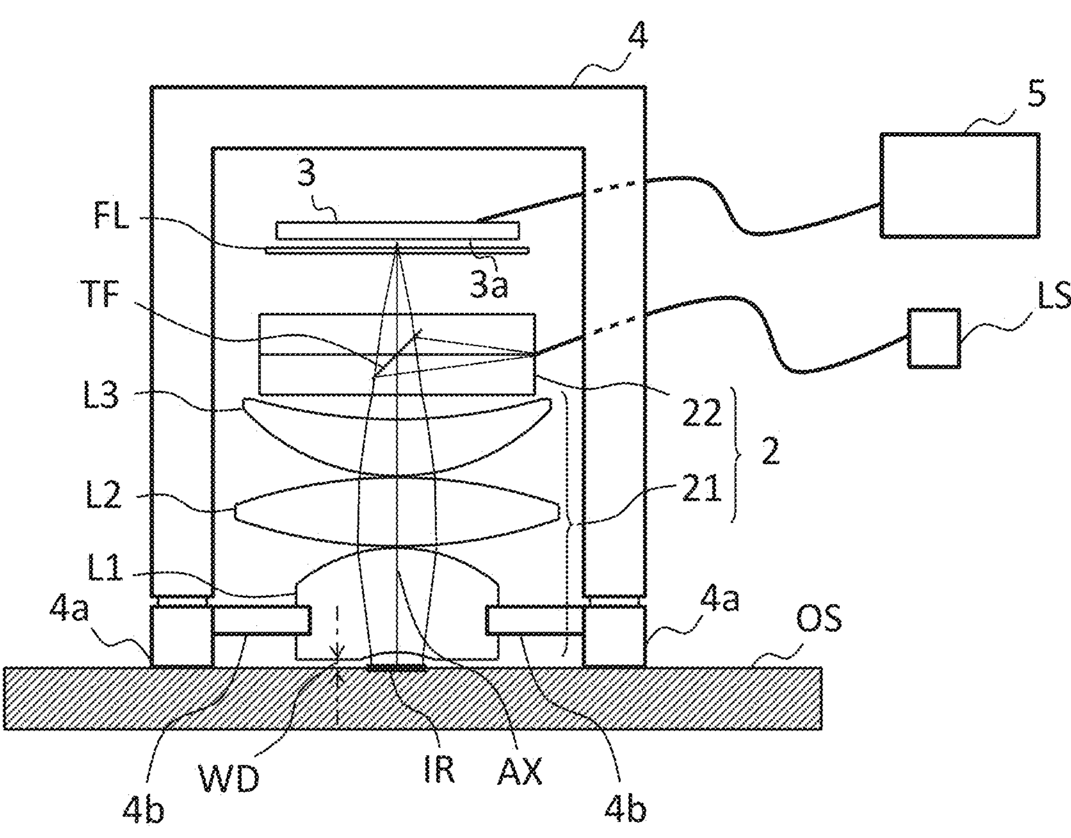

FIG. 4 schematically illustrates the configuration of the optical device 1. The optical device 1 includes a condensing optical system 2 and a photodetector 3 that are housed in a housing 4, and is electrically connected to a computer 5. Connection between the optical device 1 and the computer 5 may be wired or wireless. The optical device 1 irradiates an object surface OS with light from a light source LS, and detects reflected light from the object surface OS. FIG. 4 shows cross sections of the condensing optical system 2, the photodetector 3, the housing 4, and the object surface OS taken along a plane including the optical axis AX of the condensing optical system 2. The optical device 1 may include the computer 5.

The light source LS supplies light to the optical device 1. As a light-emitting element, the light source LS includes a light-emitting diode (LED) that emits incoherent light and/or a laser diode that emits coherent light. Light emitted by the light source LS is guided to the condensing optical system 2, for example, via a transmitting optical system including an optical fiber. For example, the use of an LED with a short coherence length as the light source LS reduces the interference (speckles) of light returning from a surface of an optical member (e.g., a surface of a lens member) included in the condensing optical system 2. The light source LS may be a super luminescent diode (SLD). The light source LS may be mounted on the optical device 1.

The condensing optical system 2 irradiates the irradiation region IR on the object surface OS with light from the light source LS, and condenses light reflected by the irradiation region IR.

Light with which the condensing optical system 2 irradiates the irradiation region IR may be polarized light. For example, the light source LS may supply light linearly polarized in a predetermined direction, using a polarizing plate. The optical device 1 may further include, for example, a polarizing plate that transmits only a component of light polarized in a predetermined direction of the light supplied from the light source LS.

The condensing optical system 2 includes a lens group 21, which includes one or more lens members, and a light-splitting member 22 disposed closer to the photodetector 3 than the lens group 21. Between the light-splitting member 22 and the photodetector 3 is disposed a filter FL for protecting the photodetector 3.

In ascending order of distance from the object surface OS, the lens group 21 includes a positive meniscus lens L1 that is convex on the photodetector 3 side and that has positive power, a biconvex positive lens L2 having positive power, and a positive meniscus lens L3 that is concave on the photodetector 3 side and that has positive power.

The positive meniscus lens L1 is a lens member disposed closest to the object surface OS. The positive meniscus lens L1 has a convex surface facing the photodetector 3 and a concave surface facing the object surface OS.

The positive meniscus lens L3 is a lens member disposed closest to the light-splitting member 22. The positive meniscus lens L3 has a concave surface facing the light-splitting member 22. Since the lens member disposed closest to the light-splitting member 22 has a concave surface facing the light-splitting member 22, space for the light-splitting member 22 is easily provided.

Table 1 below shows specifications of the condensing optical system 2 of the present embodiment.

In Table 1, m denotes the numbers of optical surfaces counted from the object surface OS side, r the radii of curvature, d the surface-to-surface distances, and ne the refractive indices for e-line (wavelength 546 nm). The radius of curvature r=∞ means a plane.

The unit of the radii of curvature r and the surface-to-surface distances d listed in Table 1 is "mm." However, the condensing optical system 2 is not limited to that shown in this table.

TABLE 1

| m | r | d | ne | |
|---|---|---|---|---|
| 0) | ∞ | 1.60 | | (object surface OS) |
| 1) | 11.70 | 12.90 | 1.839322 | (positive meniscus lens L1) |
| 2) | −19.47 | 0.20 | | |
| 3) | 60.85 | 8.50 | 1.791918 | (positive lens L2) |
| 4) | −60.85 | 0.20 | | |
| 5) | 26.00 | 7.00 | 1.839322 | (positive meniscus lens L3) |
| 6) | 66.10 | 3.00 | | |
| 7) | ∞ | 10.00 | 1.518251 | (light-splitting member 22) |
| 8) | ∞ | 7.50 | | |
| 9) | ∞ | 0.70 | 1.518251 | (filter FL) |
| 10) | ∞ | 0.75 | | |

As described above, for example, the reflection direction of the second reflected light is inclined by the apical angle A with respect to the normal direction of the regions R. To set the lower limit of the apical angle A of the projections C, which is one of targets for inspection of the object surface OS (riblet structure), to 45°, the numerical aperture on the object surface OS side of the condensing optical system 2 may be equivalent to sin 45° (0.7) or greater so that light beams inclined by 45° with respect to the normal direction of the regions R can be suitably condensed. To set the upper limit of the apical angle A of the projections C, which is one of targets for inspection of the object surface OS (riblet structure), to 50°, the numerical aperture on the object surface OS side of the condensing optical system 2 may be equivalent to sin 50° (0.8) or less so that light beams inclined by 50° with respect to the normal direction of the regions R can be suitably condensed.

In this case, the numerical aperture on the object surface OS side of the condensing optical system 2 may be determined, taking account of a predetermined margin. For example, the upper limit of the numerical aperture on the object surface OS side of the condensing optical system 2 may be set to 0.9. The numerical aperture on the object surface OS side of the condensing optical system 2 may be determined depending on the upper and lower limits of the apical angle A of the projections C to be inspected. In other words, the numerical aperture on the object surface OS side of the condensing optical system 2 may be determined based on the apical angle A of the projections C (riblet structure) to be inspected.

The lower limit of the apical angle A of the projections C to be inspected may be 40° or 30°. When the lower limit of the apical angle A of the projections C to be inspected is 40°, the numerical aperture on the object surface OS side of the condensing optical system 2 may be equivalent to sin 40° (0.6) or greater. When the lower limit of the apical angle A of the projections C to be inspected is 30°, the numerical aperture on the object surface OS side of the condensing optical system 2 may be equivalent to sin 30° (0.5) or greater.

The upper limit of the apical angle A of the projections C to be inspected may be 55° or 65°. When the upper limit of the apical angle A of the projections C to be inspected is 55°, the numerical aperture on the object surface OS side of the condensing optical system 2 may be equivalent to sin 55° (0.8) or less. When the upper limit of the apical angle A of the projections C to be inspected is 65°, the numerical aperture on the object surface OS side of the condensing optical system 2 may be equivalent to sin 65° (0.9) or less.

Let β denote the angle formed between a normal on the edge of the effective area of the surface on the object surface OS side of the optical member disposed closest to the object surface OS in the condensing optical system 2 (e.g., the surface on the object surface OS side of the lens member) and the optical axis AX of the condensing optical system 2. Let γ denote the maximum angle formed between a light beam received by the photodetector 3 of light beams incident on the optical member disposed closest to the object surface OS in the condensing optical system 2 and the optical axis AX of the condensing optical system 2. It may also be said that γ is the maximum angle formed between a light beam received by the photodetector 3 of light beams incident on the optical member disposed closest to the object surface OS in the condensing optical system 2 and the principal ray of light incident on the object surface OS from the condensing optical system 2.

In this case, setting γ>β enables the condensing optical system 2 to prevent the flux of reflected light from spreading on the surface on the object surface OS side of the optical member disposed closest to the object surface OS in the condensing optical system 2 and to condense the reflected light to the photodetector 3 suitably with a simple optical system.

Figure 5:
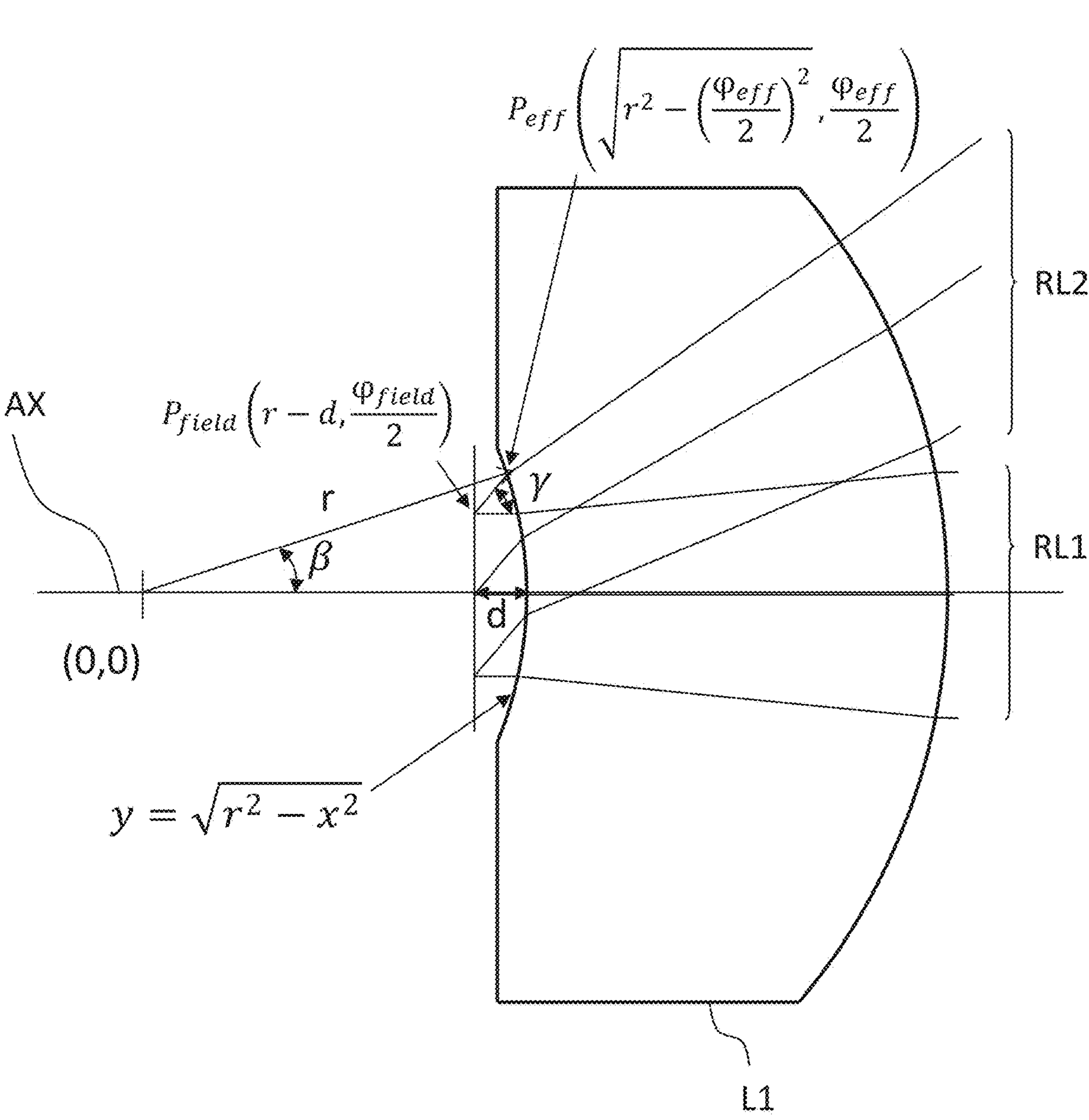
FIG. 5 schematically illustrates condensation of light by an optical member disposed closest to an object surface in a condensing optical system.

FIG. 5 schematically illustrates the optical member disposed closest to the object surface OS in the condensing optical system 2.

The positive meniscus lens L1 included in the lens group 21 of the condensing optical system 2 corresponds to the optical member disposed closest to the object surface OS in the condensing optical system 2. The radius of curvature of the lens surface on the object surface OS side of the positive meniscus lens L1 (hereafter the "first surface") is denoted by r, and the diameter of the effective area of the first surface by $\varphi_{eff}$. The point of intersection of the normal on the edge of the effective area of the first surface and the optical axis AX of the condensing optical system 2 is set as the origin (0,0), and the angle formed between the normal on the edge of the effective area of the first surface and the optical axis AX of the condensing optical system 2 is denoted by β.

FIG. 5 shows a cross section of the positive meniscus lens L1 taken along a plane including the optical axis AX of the condensing optical system 2. Since the first surface is spherical, a point (x,y) on the first surface satisfies the following expression.

$$y=\sqrt{r^2-x^2} \quad \text{[Expression 1]}$$

The coordinates of a point $P_{eff}$ on the upper edge of the effective area of the first surface can be expressed as follows.

$$\left(\sqrt{r^2-\left(\frac{\varphi_{eff}}{2}\right)^2},\ \frac{\varphi_{eff}}{2}\right) \quad \text{[Expression 2]}$$

The distance on the optical axis of the condensing optical system 2 from the object surface OS to the first surface is denoted by d, and the diameter of the irradiation region IR by $\varphi_{field}$. The coordinates of a point $P_{field}$ on the upper edge of the irradiation region IR can be expressed as follows.

$$\left(r-d,\ \frac{\varphi_{field}}{2}\right) \quad \text{[Expression 3]}$$

β corresponds to the inclination of the straight line passing through the point $P_{eff}$ and the origin. γ corresponds to the inclination of the straight line passing through the points $P_{eff}$ and $P_{field}$. Thus, regarding the spherical first surface, the conditional expression γ>β can be expressed as follows.

$$\frac{\frac{\varphi_{eff}}{2}-\frac{\varphi_{field}}{2}}{\sqrt{r^2-\left(\frac{\varphi_{eff}}{2}\right)^2}-(r-d)}>\frac{\frac{\varphi_{eff}}{2}}{\sqrt{r^2-\left(\frac{\varphi_{eff}}{2}\right)^2}} \quad \text{[Expression 4]}$$

Figure 6:
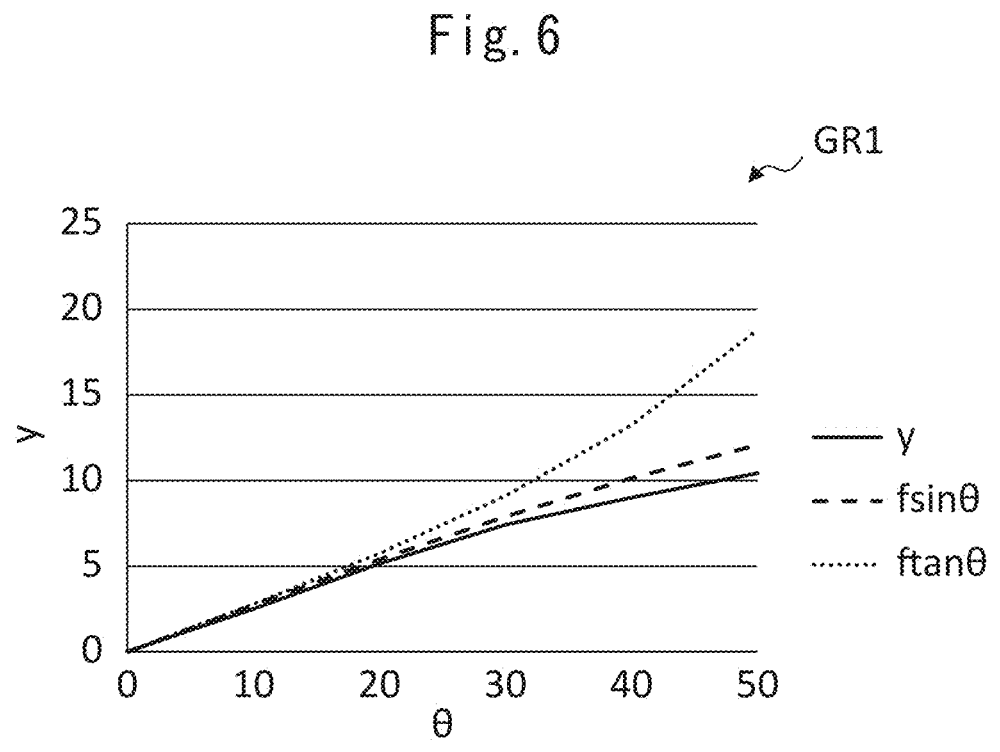

FIG. 6 illustrates a relationship of projection in the condensing optical system 2.

In the graph GR1, abscissa θ represents the angle formed between light reflected by the irradiation region IR and the optical axis AX of the condensing optical system 2, and ordinate y represents the radius of a circle circumscribing the area of light condensed on the photodetector 3 by the condensing optical system 2. f denotes the focal length of the condensing optical system 2.

The condensing optical system 2 may satisfy a conditional expression y<f sin θ. Satisfying this conditional expression prevents the area of light condensed on the photodetector 3 from being too large, and enables downsizing of the photodetector 3. It may be said that the size of the photodetector 3 is that of the photosensitive surface of the photodetector 3. Downsizing of the photosensitive surface of the photodetector 3 leads to downsizing of the photodetector 3. It may also be said that the size of the photodetector 3 is an area occupied by pixels arrayed in the photodetector 3.

Referring back to FIG. 4, the light-splitting member 22 reflects at least part of light emitted from the light source LS via an optical fiber, toward the object surface OS. The light from the light source LS reflected by the light-splitting member 22 is changed by the lens group 21 to parallel light along the optical axis AX, and is radiated to the irradiation region IR on the object surface OS.

The first reflected light RL1 and the second reflected light RL2, which are reflected by irradiating the irradiation region IR with the parallel light from the condensing optical system 2 (lens group 21), enter the lens group 21 and are guided to the light-splitting member 22.

The region of the light-splitting member 22 through which the first reflected light RL1 is transmitted is provided with an optical film TF to transmit a first portion of the first reflected light RL1 toward the photodetector 3 and to prevent a second portion of the first reflected light RL1 from entering the photodetector 3. For example, the optical film TF is provided on the optical path of the first reflected light RL1 in the light-splitting member 22 and outside the optical path of the second reflected light RL2 in the light-splitting member 22. For example, the optical film TF is provided in a region of the light-splitting member 22 including the optical axis AX in a plane intersecting the optical axis AX.

The optical film TF of the light-splitting member 22 reflects the second portion of the first reflected light RL1 in a direction different from the photodetector 3. For example, the optical film TF is inclined by 45° with respect to the optical axis AX of the condensing optical system 2, and reflects the second portion of the first reflected light RL1 in a direction opposite to the direction of light from the light source LS incident on the optical film TF. In other words, the first reflected light RL1 does not enter the photodetector 3. It may also be said that the optical film TF reflects the second portion of the first reflected light RL1 toward the end of the optical fiber from which light from the light source LS is emitted.

The optical film TF transmits the first portion of the first reflected light RL1. The first portion of the first reflected light RL1 transmitted through the optical film TF enters the photodetector 3. The amount of the first reflected light RL1 incident on the photodetector 3 can be reduced when the optical film TF is provided than when the optical film TF is not provided. The second reflected light RL2 enters the photodetector 3 via the light-splitting member 22 without entering the optical film TF. Thus the light-splitting member 22 (optical film TF) can reduce the difference between the amounts of the first reflected light RL1 and the second reflected light RL2 incident on the photodetector 3.

As described above, the first reflected light RL1 is reflected once by the irradiation region IR whereas the second reflected light RL2 is reflected multiple times (e.g., twice) by the irradiation region IR; the amount of the first reflected light RL1 is greater than that of the second reflected light RL2. If the difference between the amounts of the first reflected light RL1 and the second reflected light RL2 is beyond the dynamic range of the photodetector 3, at least one of the first reflected light RL1 and the second reflected light RL2 may not be detected.

Thus the light-splitting member 22 (optical film TF) is used to reduce the difference between the amounts of the first reflected light RL1 and the second reflected light RL2 incident on the photodetector 3, which enables the first reflected light RL1 and the second reflected light RL2 to be reliably detected.

For example, the optical film TF may be a semi-transparent mirror or a reflective film whose reflectance of the first reflected light RL1 differs from 50%. The optical film TF may be a film that reflects or transmits light incident thereon, depending on the state of polarization. For example, of light incident thereon, the optical film TF may reflect the component of s-polarized light and transmit that of p-polarized light.

The optical film TF of the light-splitting member 22 may be configured to transmit a first portion of the first reflected light RL1 toward the photodetector 3 and to absorb a second portion of the first reflected light RL1.

The optical film TF need not necessarily be provided over the whole optical path of the first reflected light RL1 in the light-splitting member 22. For example, the optical film TF may be provided over at least part of the optical path of the first reflected light RL1 in the light-splitting member 22 so that the flux of at least part of the first reflected light RL1 incident on the light-splitting member 22 enters the optical film TF.

The optical film TF need not necessarily be provided outside the optical path of the second reflected light RL2 in the light-splitting member 22. The optical film TF may be provided over part of the optical path of the second reflected light RL2 in the light-splitting member 22 so that the flux of part of the second reflected light RL2 incident on the light-splitting member 22 enters the optical film TF.

The light-splitting member 22 may be configured so that the amount of the first portion of the first reflected light RL1 is less than that of the second portion thereof. For example, the optical film TF of the light-splitting member 22 may be set so as to transmit 10% of the first reflected light RL1 incident thereon and to reflect 90% thereof. The light-splitting member 22 may be set so as to substantially prevent light incident thereon from being reflected, scattered, or absorbed in a region where the second reflected light RL2 mainly enters.

The region of the light-splitting member 22 through which the first reflected light RL1 is transmitted need not necessarily be provided with the optical film TF for transmitting a first portion of the first reflected light RL1 toward the photodetector 3 and preventing a second portion of the first reflected light RL1 from entering the photodetector 3. For example, the light-splitting member 22 may be configured so that the transmittance of the optical path of the first reflected light RL1 in the light-splitting member 22 is less than that of the second reflected light RL2 in the light-splitting member 22. For example, at least part of the optical path of the first reflected light RL1 in the light-splitting member 22 (e.g., at least part of a region of the light-splitting member 22 along the optical axis AX) may be formed of a glass material whose transmittance of the first reflected light RL1 is less than that of the second reflected light RL2, and at least part of the optical path of the second reflected light RL2 in the light-splitting member 22 may be formed of a glass material whose transmittance of the second reflected light RL2 is greater than or equal to that of the first reflected light RL1.

With reference to FIG. 4 again, the photodetector 3 is a device including two-dimensionally arrayed pixels, such as a CMOS. The photodetector 3 is disposed on a plane where the first reflected light RL1 and the second reflected light RL2 are condensed so that regions corresponding to them can be identified as different regions in the space.

The photodetector 3 outputs data indicating the result of reception of light reflected by the irradiation region IR and condensed by the condensing optical system 2 (e.g., at least one of the first reflected light RL1 and the second reflected light) in response to irradiation of the irradiation region IR with light from the condensing optical system 2. The data indicating the result of reception of light is, for example, data indicating intensity distribution of light condensed by the condensing optical system 2 (e.g., at least one of the first reflected light RL1 and the second reflected light). The data indicating intensity distribution may be two-dimensional image data.

In other words, the photodetector 3 can detect intensity distribution of light condensed by the condensing optical system 2. It may also be said that the data indicating intensity distribution outputted from the photodetector 3 is data based on light reflected from the riblet structure to be inspected. The photodetector 3 may be a device having one-dimensionally arrayed pixels, such as a line sensor. In this case also, data indicating intensity distribution of light condensed by the condensing optical system 2 can be outputted.

The photodetector 3 may be disposed on a plane different from a plane conjugate to the object surface OS with respect to the condensing optical system 2. Further, the photodetector 3 has a photosensitive surface 3*a* for receiving light condensed by the condensing optical system 2, and the photosensitive surface 3*a* may be disposed on a plane different from a plane conjugate to the object surface OS with respect to the condensing optical system 2.

The plane conjugate to the object surface OS with respect to the condensing optical system 2 corresponds to an image plane of the condensing optical system 2 for the case where the object surface OS is an object plane, or a plane conjugate to the image plane with respect to another optical system, such as a relay optical system. Light incident on the condensing optical system 2 from a point on the object surface OS is condensed to a point on the image plane of the condensing optical system 2. In other words, the first reflected light RL1 and the second reflected light RL2 overlap on the image plane of the condensing optical system 2 or the plane conjugate to the image plane. Thus, when the photodetector 3 (the photosensitive surface 3*a* of the photodetector 3) is disposed on the image plane of the condensing optical system 2 or the plane conjugate to the image plane, the first reflected light RL1 and the second reflected light RL2 are not separated on the image plane of the condensing optical system 2 or the plane conjugate to the image plane, and thus these cannot be suitably identified on intensity distribution of light detected by a single photodetector 3.

Disposing a photodetector 3 (photosensitive surface 3*a*) on a plane different from a plane conjugate to the object surface OS with respect to the condensing optical system 2 enables the first reflected light RL1 and the second reflected light RL2 to be identified and detected with the single photodetector 3. Thus the optical device 1 does not need multiple photodetectors (e.g., three photodetectors) for detecting the first reflected light RL1, the second reflected light RL2-1, and the second reflected light RL2-2 individually or an optical system for causing the reflected light to enter the respective photodetectors, which enables inspection of a riblet structure, using a small and inexpensive configuration (simple configuration).

The photosensitive surface 3*a* may be disposed closer to an exit pupil plane of the condensing optical system 2 than the optical member disposed closest to the photodetector 3 of the optical members constituting the condensing optical system 2. In this case, the exit pupil plane of the condensing optical system 2 may be opposite to the object surface OS with respect to the condensing optical system 2. In the present embodiment, the optical member disposed closest to the photodetector 3 of the optical members constituting the condensing optical system 2 is the light-splitting member 22. In this case, the photosensitive surface 3*a* may be disposed at a position whose distance from the exit pupil plane of the condensing optical system 2 is less than the distance between the light-splitting member 22 and the exit pupil plane of the condensing optical system 2. The position whose distance from the exit pupil plane of the condensing optical system 2 is less than the distance between the light-splitting member 22 and the exit pupil plane of the condensing optical system 2 may be closer or farther than the exit pupil plane as viewed from the object surface OS.

The above arrangement results in the photosensitive surface 3*a* being disposed at a position different from the plane conjugate to the object surface OS with respect to the condensing optical system 2 (a position different from the image plane of the condensing optical system 2 or the plane conjugate to the image plane) on or near the exit pupil plane of the condensing optical system 2, which enables the first reflected light RL1 and the second reflected light RL2 to be suitably identified on intensity distribution of light detected by the single photodetector 3.

The size in the photosensitive surface 3*a* of a region of light flux that enters the condensing optical system 2 from a point on the object surface OS at a maximum numerical aperture on the object surface OS side of the condensing optical system 2 and that reaches the photodetector 3 may be greater than zero times the size of the photosensitive surface 3*a*. In other words, light flux that enters the condensing optical system 2 from a point on the object surface OS at a maximum numerical aperture on the object surface OS side of the condensing optical system 2 and that reaches the photodetector 3 need not necessarily be condensed to a point on the photosensitive surface 3*a* of the photodetector 3 (a point of condensed light need not necessarily be formed on the photosensitive surface 3*a*). To put it another way, an image of the object surface OS need not necessarily be formed on the photosensitive surface 3*a* of the photodetector 3. The size of this region may be, for example, at least 0.1 times the size of the photosensitive surface 3*a*. In this case, regions corresponding to the first reflected light RL1 and the second reflected light RL2 can be suitably identified on intensity distribution of light detected by the single photodetector 3.

The area of a point on the object surface OS is assumed to be zero. For example, when the size in the photosensitive surface 3*a* of a region of light flux that enters the condensing optical system 2 from a point on the object surface OS at a maximum numerical aperture on the object surface OS side of the condensing optical system 2 and that reaches the photodetector 3 is zero times the size of the photosensitive surface 3*a*, the photosensitive surface 3*a* is disposed on the plane conjugate to the object surface OS with respect to the condensing optical system 2 (the image plane of the condensing optical system 2 or the plane conjugate to the image plane). When the size of this region is zero times the size of the photosensitive surface 3*a*, i.e., when light is condensed to a point on the photosensitive surface 3*a*, the first reflected light RL1 and the second reflected light RL2 overlap on the photosensitive surface 3*a*, and thus regions corresponding to the first reflected light RL1 and the second reflected light RL2 cannot be suitably identified on intensity distribution of light detected by the single photodetector 3.

The size of this region need not necessarily be at least 0.1 times the size of the photosensitive surface 3*a*, and may be, for example, at least 0.001 times, 0.01 times, one time, or ten times thereof.

The photosensitive surface 3*a* may be disposed on a plane into which the object surface OS is optically Fourier transformed by the condensing optical system 2. The plane into which the object surface OS is optically Fourier transformed by the condensing optical system 2 may be referred to as a pupil plane of the condensing optical system 2. The photosensitive surface may be disposed in a pupil space defined by the pupil plane of the condensing optical system 2 and an optical surface on the incident side adjacent to the pupil plane.

In the condensing optical system 2, the diameter of light flux supplied from the light source LS to the light-splitting member 22 corresponds to that of an aperture stop. For example, the exit pupil plane of the condensing optical system 2 is a plane conjugate to a position where the diameter of light flux emitted from the light source LS is restricted (e.g., the end face on the light-splitting member 22 side of the optical fiber connecting the light source LS and the light-splitting member 22).

In the optical device 1 of the present embodiment, the photosensitive surface 3*a* is disposed on the exit pupil plane of the condensing optical system 2 as an example. The photosensitive surface 3*a* may be disposed on a plane conjugate to the exit pupil plane of the condensing optical system 2 with respect to another optical system, such as a relay optical system.

The optical device 1 may include multiple photodetectors for detecting the first reflected light RL1, the second reflected light RL2-1, and the second reflected light RL2-2 individually or an optical system for causing the reflected light to enter the respective photodetectors.

The light source LS may include an aperture stop on an emission surface from which light flux is emitted or a plane conjugate to the emission surface with respect to a transmitting optical system that light emitted from the light source LS enters. Such an aperture stop enables the angle of divergence of light flux to the irradiation region IR irradiated by the condensing optical system 2 with light to be suitably set. It may also be said that the numerical aperture on the object surface OS side (irradiation region IR side) of the condensing optical system 2 can be suitably adjusted with an aperture stop.

The transmitting optical system may include a relay optical system. The transmitting optical system may include a field stop. For example, when the transmitting optical system includes a relay optical system, the relay optical system may include a field stop. The area of the irradiation region IR irradiated by the condensing optical system 2 with light can be suitably set with a field stop.

A light intensity measurement device for measuring the intensity of light emitted from the light source LS may be provided. The light intensity measurement device may be disposed on an optical path split by a beam splitter, such as a semi-transparent mirror, disposed on the optical path of light between emission from the light source LS and irradiation of the irradiation region IR. The light intensity measurement device may measure the intensity of light split by this beam splitter. Output of the light source LS may be adjusted based on the intensity of light emitted from the light source LS and measured by the light intensity measurement device.

Figure 7:
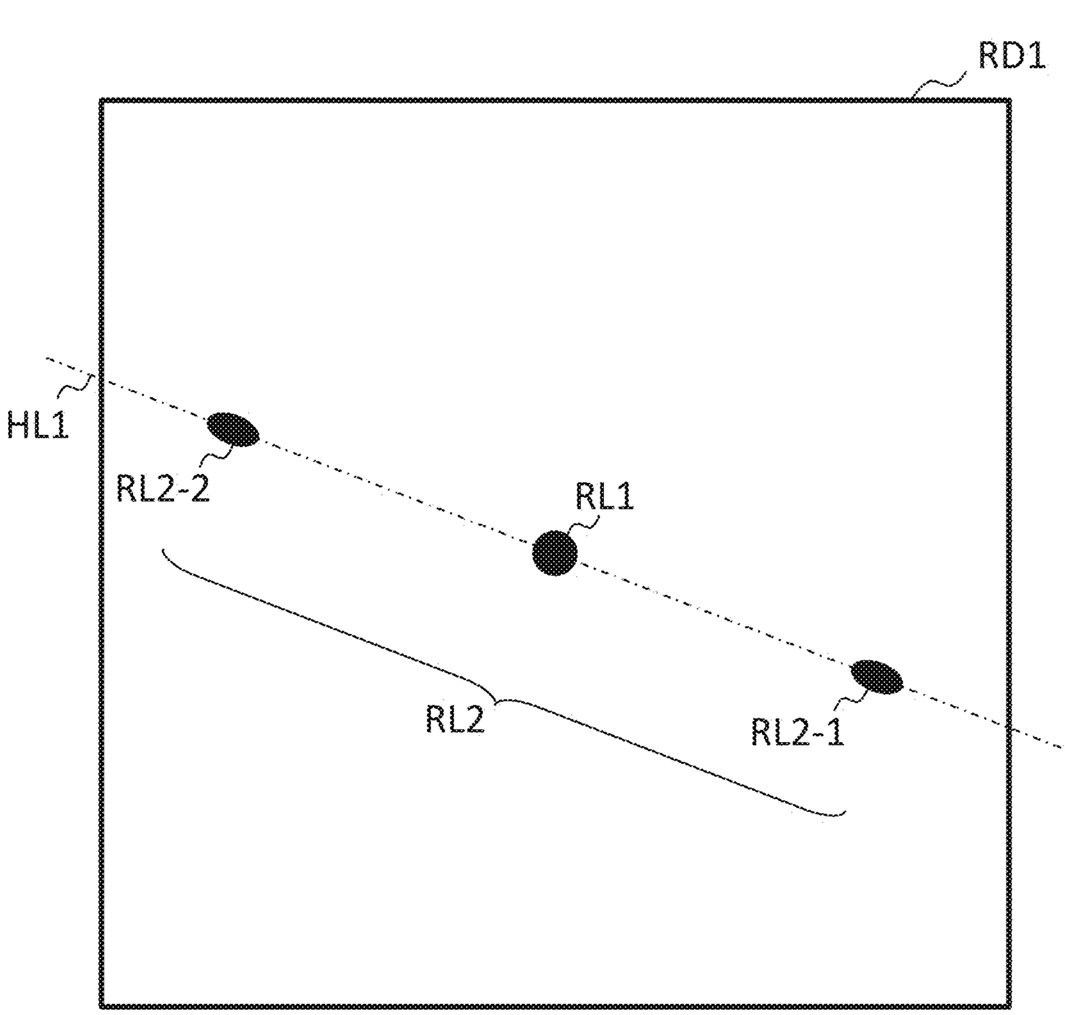
FIG. 7 schematically illustrates first received-light data.

FIG. 7 schematically illustrates first received-light data (an example of an image represented by first received-light data).

In first received-light data RD1, which is an example of received-light data indicating the result of reception of light, the amount of light corresponding to the first reflected light RL1 is shown in a center region around the optical axis AX of the condensing optical system 2, and the amount of light corresponding to the second reflected light RL2 is shown in regions other than the center region. For illustrative purposes, FIG. 7 shows a virtual line HL1 corresponding to the direction perpendicular to the first direction D1 in which the projections C extend on the object surface OS.

When the slopes T1 and T2 of the projections C are symmetrical about the third direction D3, a pair of second reflected light RL2-1 and RL2-2 included in the second reflected light RL2 is shown on the virtual line HL at positions symmetrical about a position corresponding to the optical axis AX of the condensing optical system 2. In the first received-light data RD1, the first reflected light RL1 is shown at a position on the virtual line HL1.

The received-light data indicating the result of reception of light may be data indicating intensity distribution of light condensed on the photosensitive surface 3*a* by the condensing optical system 2. The data indicating intensity distribution of light condensed on the photosensitive surface 3*a* by the condensing optical system 2 is not limited to a two-dimensional image, such as the first received-light data RD1 shown in FIG. 7, and may be, for example, data indicating intensity distribution of the amount of light along the virtual line HL1. The received-light data indicating the result of reception of light need not necessarily show one of the second reflected light RL2-1 and RL2-2 of the second reflected light RL2. For example, the photodetector 3 may detect at least one of the second reflected light RL2-1 and RL2-2 of the second reflected light RL2 condensed on the photosensitive surface 3*a* by the condensing optical system 2.

With reference to FIG. 4 again, the housing 4 houses the condensing optical system 2 and the photodetector 3, and is formed of a plastic material, such as polypropylene and ABS resin. The housing 4 may be formed of a metallic material, such as an aluminum alloy.

The housing 4 includes a contact member 4*a*. The contact member 4*a* projects toward the object surface OS more than the positive meniscus lens L1 disposed closest to the object surface OS of the optical members constituting the condensing optical system 2, and is capable of contacting the object surface OS. The contact member 4*a* is capable of contacting at least a subregion on the object surface OS except the irradiation region IR.

The contact member 4*a* and the condensing optical system 2 are disposed so that the distance in the direction of the optical axis AX of the condensing optical system 2 between the condensing optical system 2 and the object surface OS equals a working distance WD on the object surface OS side of the condensing optical system 2 when the contact member 4*a* contacts the object surface OS. Since the contact member 4*a* brought into contact with the object surface OS causes the distance between the condensing optical system 2 and the object surface OS to equal a working distance WD on the object surface OS side of the condensing optical system 2, the optical device 1 including the contact member 4*a* and the condensing optical system 2 disposed in this way can simply inspect the object surface OS.

The contact member 4*a* includes a support member 4*b*. For example, the support member 4*b* may support the positive meniscus lens L1 of the condensing optical system 2. The support member 4*b* may support the positive meniscus lens L1 so as not to change the position of the positive meniscus lens L1 relative to the housing 4. The support member 4*b* may support the positive meniscus lens L1 disposed closest to the object surface OS so that the distance in the direction of the optical axis AX of the condensing optical system 2 between the condensing optical system 2 and the object surface OS equals a working distance WD on the object surface OS side of the condensing optical system 2 when the contact member 4*a* contacts the object surface OS. The support member 4*b* may support at least one of another optical member of the condensing optical system 2 (at least one of the positive lens L2, the positive meniscus lens L3, and the light-splitting member 22) and the photodetector 3, in addition to the positive meniscus lens L1.

The contact member 4*a* may be formed of a material whose hardness is less than that of the material of the projections C of the object surface OS to prevent deformation of the object surface OS caused by contact with the object surface OS.

The contact member 4*a* may be integrated with the housing 4. The contact member 4*a* need not necessarily support the optical member included in the condensing optical system 2 and the photodetector 3 directly, and another member may support them.

The optical device 1 need not necessarily be brought into contact with the object surface OS. The housing 4 need not necessarily include the contact member 4*a*.

The computer 5 is an information processor that obtains received-light data from the photodetector 3 and that inspects the object surface OS.

The computer 5 is communicably connected to the optical device 1 in accordance with an existing communication standard, such as Universal Serial Bus (USB, registered trademark) or Bluetooth (registered trademark).

Figure 8:
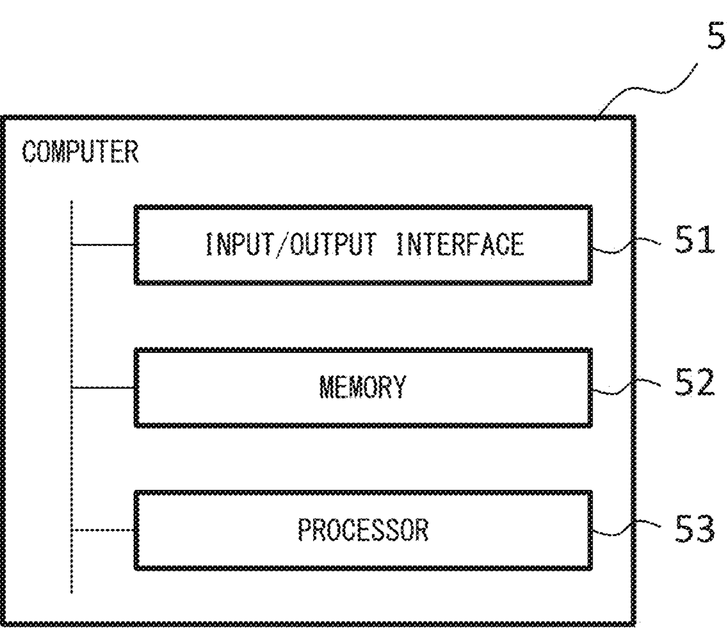
FIG. 8 schematically illustrates the configuration of a computer.

FIG. 8 schematically illustrates the configuration of the computer 5.

The computer 5 includes an input/output interface 51, a memory 52, and a processor 53.

The input/output interface 51, which is an example of a communication unit, includes an interface circuit for receiving data to be processed by the computer 5 or outputting data processed by the computer 5. The input/output interface 51 includes, for example, a peripheral interface circuit for connecting the computer 5 to the optical device 1 and various peripherals, such as a keyboard and a display, or a communication interface circuit for connecting the computer 5 to a communication network.

The memory 52, which is an example of a storage unit, includes volatile and nonvolatile semiconductor memories. The memory 52 stores various types of data used for processing by the processor 53, such as received-light data obtained from the photodetector 3 and standard data and thresholds for inspecting a riblet structure. The memory 52 also stores various application programs, such as a program for inspection to execute an inspection process. It may also be said that the standard data for inspecting a riblet structure is reference data for inspecting a riblet structure.

The processor 53, which is an example of a control unit, includes one or more processors and a peripheral circuit thereof. The processor 53 may further include another operating circuit, such as a logic-arithmetic unit, an arithmetic unit, or a graphics processing unit.

Figure 9:
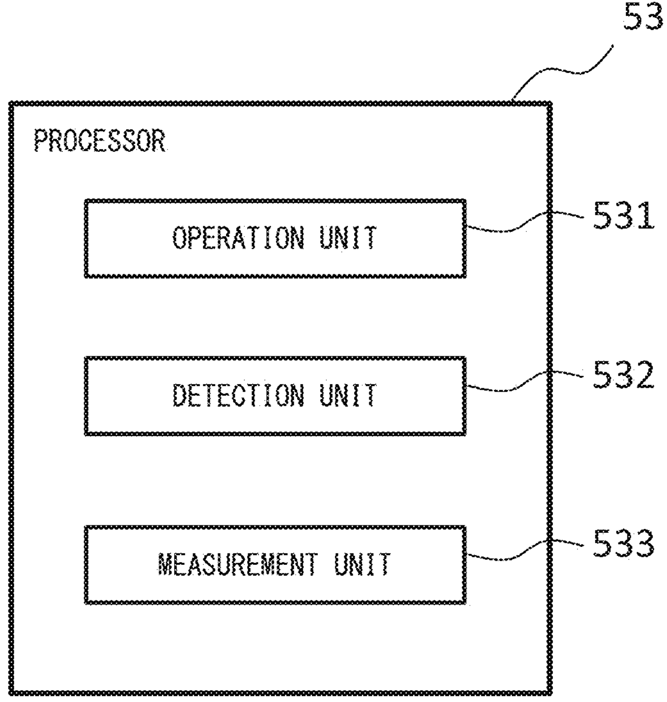
FIG. 9 is a functional block diagram of a processor included in the computer.

FIG. 9 is a functional block diagram of the processor 53 included in the computer 5.

As its functional blocks, the processor 53 of the computer 5 includes an operation unit 531, a detection unit 532, and a measurement unit 533. These units included in the processor 53 are functional modules implemented by a program executed by the processor 53. The computer program for achieving the functions of the units of the processor 53 may be provided in a form recorded on a computer-readable portable storage medium, such as a semiconductor memory, a magnetic medium, or an optical medium. Alternatively, the units included in the processor 53 may be implemented in the computer 5 as separate integrated circuits, microprocessors, or firmware.

The operation unit 531 executes operations including inspection of a riblet structure on an object surface OS, based on received-light data RD obtained from the photodetector 3. The object surface OS is an example of the to-be-inspected surface that is a target for inspection in operations by the operation unit 531. Received-light data RD obtained from the photodetector 3 may be data indicating intensity distribution of light condensed on the photosensitive surface 3*a* by the condensing optical system 2, e.g., image data, as described above. The operation unit 531 can also be referred to as an inspection unit because it inspects a riblet structure.

In inspection of the object surface OS, the operation unit 531 inspects at least one of the projections C, the regions R, and the projections C and the regions R.

The operation unit 531 may determine the appropriateness of the shape of the projections C, as inspection of the riblet structure, based on data indicating intensity distribution.

The operation unit 531 may inspect the riblet structure, based on the result of comparison between the intensities of first reflected light RL1 incident on the photosensitive surface 3*a* and second reflected light RL2 incident on the photosensitive surface 3*a*. For example, the operation unit 531 may determine the appropriateness of the shape of the riblet structure, as inspection of the riblet structure, based on the result of comparison between the intensities of first reflected light RL1 incident on the photosensitive surface 3*a* and second reflected light RL2 incident on the photosensitive surface 3*a*. For example, the operation unit 531 may determine the appropriateness of the shape of the projections C, as the appropriateness of the shape of the riblet structure.

The intensity of reflected light incident on the photosensitive surface 3*a* corresponds to the luminance of a region corresponding to the reflected light in data indicating intensity distribution detected by the photodetector 3 (on an image represented by the intensity distribution data). The operation unit 531 identifies regions corresponding to the first reflected light RL1 and the second reflected light RL2 (on the image represented by the intensity distribution data) from the data indicating intensity distribution. For example, the operation unit 531 extracts pixels whose luminance values are greater than or equal to a predetermined threshold on the image represented by the intensity distribution data, and groups a set of the extracted pixels by clustering, thereby identifying the regions corresponding to the first reflected light RL1 and the second reflected light RL2 on the image represented by the intensity distribution data.

The operation unit 531 calculates a statistically representative value, such as the maximum (peak), average, mode, and median, of the luminance of each identified region. The representative value of the luminance of the region corresponding to the first reflected light RL1 calculated by the operation unit 531 indicates the intensity of the first reflected light RL1 incident on the photosensitive surface 3*a*. The representative value of the luminance of the region corresponding to the second reflected light RL2 calculated by the operation unit 531 indicates the intensity of the second reflected light RL2 incident on the photosensitive surface 3*a*. The operation unit 531 then compares the representative values of the luminance of the regions corresponding to the first reflected light RL1 and the second reflected light RL2 in the data indicating intensity distribution (on the image represented by the intensity distribution data), thereby comparing the intensities of the first reflected light RL1 and the second reflected light RL2.

The operation unit 531 may calculate at least one of the above statistically representative values. In other words, the operation unit 531 may calculate at least one of the maximum (peak), average, mode, and median of the luminance of each identified region. Instead of clustering, the operation unit 531 may use another method to identify the regions corresponding to the first reflected light RL1 and the second reflected light RL2 (on the image represented by the intensity distribution data) from the data indicating intensity distribution.

For example, the operation unit 531 may use template matching to identify the regions corresponding to the first reflected light RL1 and the second reflected light RL2 on the image represented by the intensity distribution data. In this case, the operation unit 531 may compare a template that is standard data indicating reference intensity distribution of the first reflected light RL1 and the second reflected light RL2 with data indicating intensity distribution outputted from the photodetector 3, thereby identifying the regions corresponding to the first reflected light RL1 and the second reflected light RL2 on the image represented by the intensity distribution data.

In comparison between the intensities of the first reflected light RL1 and the second reflected light RL2, the operation unit 531 determines the ratio between the intensities of the first reflected light RL1 and the second reflected light RL2. In comparison between the intensities of the first reflected light RL1 and the second reflected light RL2, the operation unit 531 may determine the difference between the intensities of the first reflected light RL1 and the second reflected light RL2.

For example, in an object surface OS where the tops of projections C are chipped (worn) and rounded, for example, by friction with a fluid, reduction in fluid resistance by the riblet structure may be insufficient. Since the intensity of second reflected light reflected in the above reflection directions of second reflected light RL2 (i.e., the second and third reflection directions) is reduced, the intensity of second reflected light RL2 reflected by an object surface OS where the tops of projections C are chipped is less than the intensity of second reflected light RL2 reflected by an object surface OS where the tops are not chipped. For this reason, the statistically representative value of the luminance of a region on an image represented by intensity distribution data corresponding to second reflected light RL2 reflected by an object surface OS where the tops of projections C are chipped is changed from (e.g., less than) the statistically representative value of the luminance of a region on an image represented by intensity distribution data corresponding to second reflected light RL2 reflected by an object surface OS where the tops are not chipped.

More specifically, the area of slopes (the slopes T1 and T2) specified by a predetermined apical angle A (e.g., 45°)

is smaller in an object surface OS where the tops of projections C are chipped than in an object surface OS where the tops of projections C are not chipped. This reduces the amount of light reflected by the slopes of projections C of light entering on the object surface OS, and thus reduces the amount of second reflected light RL2.

It may also be said that second reflected light RL2 reflected by an object surface OS where the tops of projections C are chipped disperses over a larger region in the photosensitive surface 3*a* than second reflected light RL2 reflected by an object surface OS where the tops are not chipped. For this reason, it may also be said that the statistically representative value of the luminance of a region corresponding to second reflected light RL2 reflected by an object surface OS where the tops are chipped is changed from the statistically representative value of the luminance of a region corresponding to second reflected light RL2 reflected by an object surface OS where the tops are not chipped.

Even when the tops of projections C are chipped, the statistically representative value of the luminance of a region on an image represented by intensity distribution data corresponding to first reflected light RL1 reflected by regions R is not substantially changed, unless the state of regions R is changed, compared to when the tops of projections C are not chipped.

In view of the above, the ratio between the intensities of first reflected light RL1 and second reflected light RL2 reflected by an object surface OS where the tops of projections C are chipped is changed from the ratio between the intensities of first reflected light RL1 and second reflected light RL2 reflected by an object surface OS where the tops of projections C are not chipped.

For example, when the value of the difference between the ratio of the intensity of the second reflected light RL2 to that of the first reflected light RL1 calculated based on the received-light data RD (i.e., the value of the ratio of the representative value of the luminance of the region corresponding to the second reflected light RL2 on the image represented by the intensity distribution data to the representative value of the luminance of the region corresponding to the first reflected light RL1 on the image represented by the intensity distribution data) and the value of a reference ratio exceeds a predetermined threshold, the operation unit 531 may determine that the roundness of the apexes of the projections C, which corresponds to the shape of the projections C on the object surface OS, is inappropriate.

That the roundness of the apexes of the projections C is inappropriate may mean the state in which the apexes of the projections C are relatively badly chipped (worn), for example, by friction with a fluid. It may also be said that the projections C of which the roundness of the apexes is inappropriate are degraded, and that the roundness of the apexes of the projections C, which corresponds to the shape of the projections C, is the curvature or the radius of curvature of the apexes of the projections C.

It may also be said that the value of the reference ratio is standard data for inspecting the appropriateness of a riblet structure (projections of an object surface OS). The value of the reference ratio may be the value of the ratio of the intensity of second reflected light RL2 to that of first reflected light RL1 reflected by actually irradiating an object surface OS having regions R and projections C whose shape can be regarded as non-defective (e.g., the tops of the projections C are not chipped) with light. The value of the reference ratio may be the value of the ratio of the intensity of second reflected light RL2 to that of first reflected light RL1 calculated by simulation, such as ray tracing, under the assumption that a surface having projections C of non-defective shape and regions R formed thereon is irradiated with light.

When the calculated value of the ratio of the intensity of the second reflected light RL2 to that of the first reflected light RL1 differs from the value of the reference ratio, the operation unit 531 may determine that the roundness of the apexes of the projections C is inappropriate. For example, when the calculated value of the ratio of the intensity of the second reflected light RL2 to that of the first reflected light RL1 is less than the value of the reference ratio, the operation unit 531 may determine that the roundness of the apexes of the projections C is inappropriate.

Figure 10:
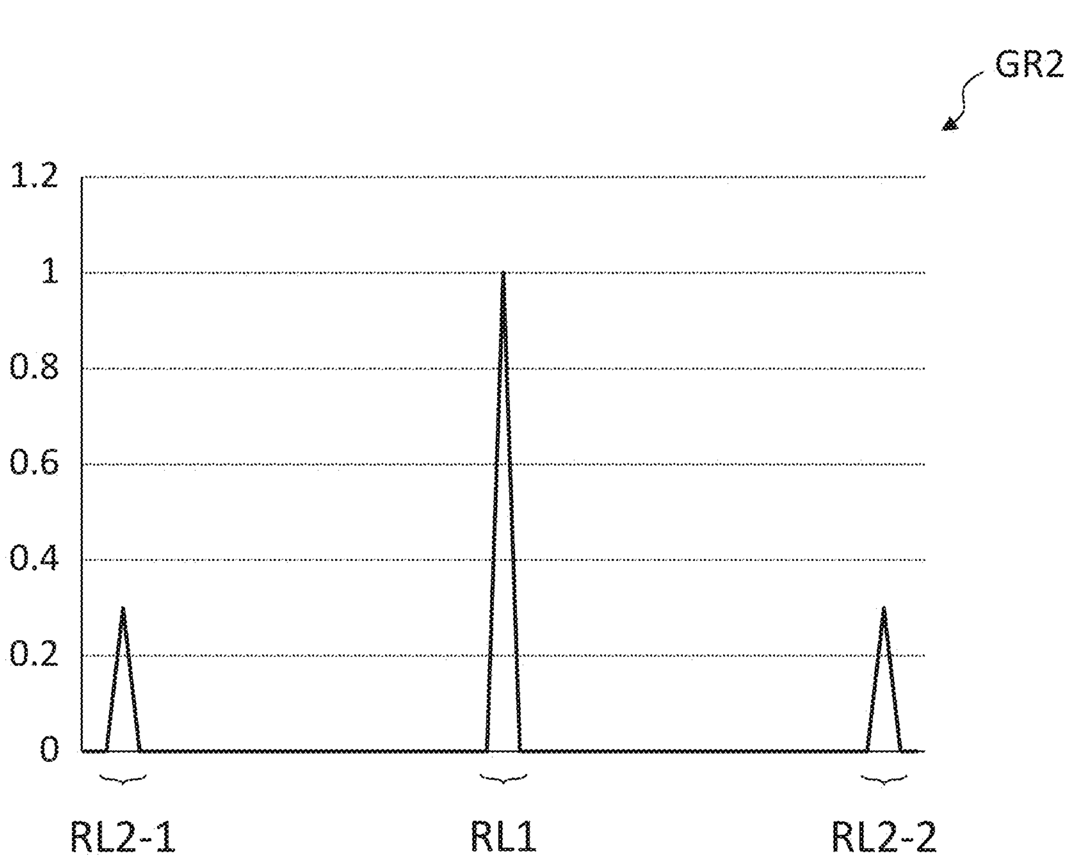
FIG. 10 illustrates the ratio between the amounts of first reflected light and second reflected light in the first received-light data.

FIG. 10 illustrates the luminance ratio between the first reflected light RL1 and the second reflected light RL2 in the first received-light data RD1.

For example, in the graph GR2 corresponding to the first received-light data RD1, the abscissa represents the position on the virtual line HL1, and the ordinate represents the luminance ratio for the case where the luminance of the peak corresponding to the first reflected light RL1 is 1. The peak corresponding to the first reflected light RL1 is shown on the virtual line HL1 between the peaks corresponding to the second reflected light RL2-1 and RL2-2. The value of the luminance ratio at the peaks corresponding to the pair of second reflected light RL2-1 and RL2-2 shown on the virtual line HL1 is 0.3.

For example, when the standard data for inspecting the appropriateness of a riblet structure (projections of an object surface OS) (e.g., the value of the reference ratio) is 0.2 and the predetermined threshold is ±0.2, the difference between the luminance ratio at the peaks corresponding to the second reflected light RL2-1 and RL2-2, 0.3, and the value of the reference ratio, 0.2, is 0.1 and does not exceed the predetermined threshold, ±0.2; thus the operation unit 531 determines that the roundness of the apexes of the projections C, which corresponds to the shape of the projections C of the object surface OS, is appropriate.

The target for determination of appropriateness by the operation unit 531 is not limited to the roundness of the apexes of the projections C. For example, the operation unit 531 may determine the appropriateness of at least one of the apical angle A of the projections C, the height H of the projections C, the symmetry of the projections C, and the pitch P in the second direction D2 of the projections C, which correspond to the shape of the riblet structure (the shape of the projections C), by the above process.

The operation unit 531 may also use the intensity of light emitted from the light source LS outputted from the light intensity measurement device to determine the appropriateness of the riblet structure.

The operation unit 531 may omit to use the second reflected light RL2-1 or RL2-2 of the second reflected light RL2 in the above inspection of the appropriateness of the riblet structure. In this case, the operation unit 531 may omit to calculate the intensity of the second reflected light RL2-1 (i.e., the statistically representative value of the luminance of the region corresponding to the second reflected light RL2-1 on the image represented by the intensity distribution data) or the intensity of the second reflected light RL2-2 (i.e., the statistically representative value of the luminance of the region corresponding to the second reflected light RL2-2 on the image represented by the intensity distribution data).

For example, the operation unit 531 may calculate the ratio between the intensities of the first reflected light RL1 and the second reflected light RL2-1 (i.e., the value of the ratio of the representative value of the luminance of the region corresponding to the second reflected light RL2-1 on the image represented by the intensity distribution data to the statistically representative value of the luminance of the region corresponding to the first reflected light RL1 on the image represented by the intensity distribution data) or the ratio between the intensities of the first reflected light RL1 and the second reflected light RL2-2 (i.e., the value of the ratio of the statistically representative value of the luminance of the region corresponding to the second reflected light RL2-2 on the image represented by the intensity distribution data to the statistically representative value of the luminance of the region corresponding to the first reflected light RL1 on the image represented by the intensity distribution data), and compare the ratio with the above standard data for inspecting the appropriateness of a riblet structure, thereby determining the appropriateness of the shape of the riblet structure (e.g., the appropriateness of the roundness of the apexes of the projections C).

The operation unit 531 may omit to use the first reflected light RL1 in the above inspection of the appropriateness of the riblet structure. In this case, the operation unit 531 may omit to calculate the intensity of the first reflected light RL1 (i.e., the statistically representative value of the luminance of the region corresponding to the first reflected light RL1 on the image represented by the intensity distribution data). For example, the operation unit 531 may calculate the intensity of the second reflected light RL2 (i.e., the statistically representative value of the luminance of the region corresponding to the second reflected light RL2 on the image represented by the intensity distribution data), and compare the intensity with the standard data for inspecting the appropriateness of a riblet structure, thereby determining the appropriateness of the shape of the riblet structure (e.g., the appropriateness of the roundness of the apexes of the projections C).

In this case, the standard data for inspecting the appropriateness of a riblet structure may be a reference intensity of second reflected light RL2 reflected by actually irradiating an object surface OS having regions R and projections C whose shape can be regarded as non-defective with light, or a reference intensity of second reflected light RL2 calculated by simulation.

The operation unit 531 may calculate the intensity of the second reflected light RL2-1 of the second reflected light RL2 (i.e., the statistically representative value of the luminance of the region corresponding to the second reflected light RL2-1 on the image represented by the intensity distribution data) or the intensity of the second reflected light RL2-2 (i.e., the statistically representative value of the luminance of the region corresponding to the second reflected light RL2-2 on the image represented by the intensity distribution data), and compare the intensity with the above standard data for inspecting the appropriateness of a riblet structure, thereby determining the appropriateness of the shape of the riblet structure.

For example, the operation unit 531 may compare the difference between the calculated intensity of the second reflected light RL2-1 and the reference intensity of the second reflected light RL2-1 with a predetermined threshold to determine the appropriateness of the shape of the riblet structure. The operation unit 531 may compare the difference between the calculated intensity of the second reflected light RL2-2 and the reference intensity of the second reflected light RL2-2 with a predetermined threshold to determine the appropriateness of the shape of the riblet structure.

For example, when the calculated intensity of the second reflected light RL2-1 differs from the reference intensity of the second reflected light RL2-1, the operation unit 531 may determine that the shape of the riblet structure is inappropriate. When the calculated intensity of the second reflected light RL2-2 differs from the reference intensity of the second reflected light RL2-2, the operation unit 531 may determine that the shape of the riblet structure is inappropriate.

For example, when the calculated intensity of the second reflected light RL2-1 is less than the reference intensity of the second reflected light RL2-1, the operation unit 531 may determine that the shape of the riblet structure is inappropriate. When the calculated intensity of the second reflected light RL2-2 is less than the reference intensity of the second reflected light RL2-2, the operation unit 531 may determine that the shape of the riblet structure is inappropriate.

The operation unit 531 may inspect the riblet structure, based on the distance between the positions of entry into the photosensitive surface 3*a* of the first reflected light RL1 and the second reflected light RL2-1, and the distance between the positions of entry of the first reflected light RL1 and the second reflected light RL2-2. For example, the operation unit 531 may determine the appropriateness of the shape of the riblet structure, as inspection of the riblet structure, based on the distance between the positions of entry into the photosensitive surface 3*a* of the first reflected light RL1 and the second reflected light RL2-1, and the distance between the positions of entry of the first reflected light RL1 and the second reflected light RL2-2. For example, the operation unit 531 may determine the appropriateness of the shape of the projections C, as the appropriateness of the shape of the riblet structure.

The position of entry into the photosensitive surface 3*a* of reflected light corresponds to the position of a region corresponding to the reflected light in data indicating intensity distribution detected by the photodetector 3 (on an image represented by the intensity distribution data). In a manner similar to that described above, the operation unit 531 identifies regions corresponding to the first reflected light RL1 and the second reflected light RL2 (on the image represented by the intensity distribution data) from the data indicating intensity distribution. For example, the operation unit 531 extracts pixels whose luminance values are greater than or equal to a predetermined threshold on the image represented by the intensity distribution data, and groups a set of the extracted pixels by clustering. The operation unit 531 may identify the regions corresponding to the first reflected light RL1 and the second reflected light RL2 on the image represented by the intensity distribution data, using template matching.

For each of the identified regions corresponding to the first reflected light RL1 and the second reflected light RL2 on the image represented by the intensity distribution data, the operation unit 531 calculates at least one of the position of a pixel having maximum luminance and the centroid position of the region, as a representative position of the reflected light.

The position corresponding to the first reflected light RL1 on the image represented by the intensity distribution data (the representative position of the first reflected light RL1) calculated by the operation unit 531 indicates the position of entry of the first reflected light RL1 on the photosensitive surface 3*a*. The position corresponding to the second reflected light RL2 on the image represented by the intensity distribution data (the representative position of the second reflected light RL2) calculated by the operation unit 531 indicates the position of entry of the second reflected light RL2 on the photosensitive surface 3a.

Based on the identified position corresponding to the first reflected light RL1 (the representative position of the first reflected light RL1) and the identified positions corresponding to the second reflected light RL2-1 and RL2-2 (the representative positions of the second reflected light RL2) on the image represented by the intensity distribution data, the operation unit 531 calculates the distance between the positions corresponding to the first reflected light RL1 and the second reflected light RL2-1 on the image represented by the intensity distribution data, and the distance between the positions corresponding to the first reflected light RL1 and the second reflected light RL2-2.

The distance between the positions corresponding to the first reflected light RL1 and the second reflected light RL2-1 on the image represented by the intensity distribution data indicates the distance between the positions of entry of the first reflected light RL1 and the second reflected light RL2-1. The distance between the positions corresponding to the first reflected light RL1 and the second reflected light RL2-2 on the image represented by the intensity distribution data indicates the distance between the positions of entry of the first reflected light RL1 and the second reflected light RL2-2.

For example, the second reflected light RL2-1 is light reflected by the slopes T1 of the projections C and the regions R, and the second reflected light RL2-2 is light reflected by the slopes T2 of the projections C and the regions R. When the inclinations of the slopes T1 and T2 are not symmetrical about the third direction D3, the reflection directions of the second reflected light RL2-1 and RL2-2 are not symmetrical. This results in the distance between the positions of entry of the first reflected light RL1 and the second reflected light RL2-1 differing from the distance between the positions of entry of the first reflected light RL1 and the second reflected light RL2-2. When the difference between the ratio or difference between the calculated distance between the positions of entry of the first reflected light RL1 and the second reflected light RL2-1 and the calculated distance between the positions of entry of the first reflected light RL1 and the second reflected light RL2-2 and the value of a reference ratio or difference exceeds a predetermined threshold, the operation unit 531 can determine that the symmetry of the projections C, which corresponds to the shape of the projections C, is inappropriate.

When the difference between the ratio or difference between the calculated distance between the positions of entry of the first reflected light RL1 and the second reflected light RL2-1 and the calculated distance between the positions of entry of the first reflected light RL1 and the second reflected light RL2-2 and the value of a reference ratio or difference does not exceed a predetermined threshold, the operation unit 531 can determine that the symmetry of the projections C, which corresponds to the shape of the projections C, is appropriate.

It may also be said that the value of the above reference is standard data for inspecting the appropriateness of a riblet structure. The value of the reference may be the ratio or difference between the distance between the positions of entry into the photosensitive surface 3a of first reflected light RL1 and second reflected light RL2-1 and the distance between the positions of entry into the photosensitive surface 3a of first reflected light RL1 and second reflected light RL2-2 reflected by actually irradiating an object surface OS having regions R and projections C whose shape can be regarded as non-defective (e.g., one slope T1 and the other slope T2 of each projection C are symmetrical about the third direction D3) with light.

The value of the reference may be the ratio or difference between the distance between the positions of entry into the photosensitive surface 3a of first reflected light RL1 and second reflected light RL2-1 and the distance between the positions of entry into the photosensitive surface 3a of first reflected light RL1 and second reflected light RL2-2 calculated by simulation, such as ray tracing, under the assumption that a surface having projections C of non-defective shape and regions R formed thereon is irradiated with light.

When the value of the ratio or difference between the calculated distance between the positions of entry of the first reflected light RL1 and the second reflected light RL2-1 and the calculated distance between the positions of entry of the first reflected light RL1 and the second reflected light RL2-2 differs from the value of the reference ratio or difference, the operation unit 531 may determine that the symmetry of the projections C is inappropriate. When the calculated distance between the positions of entry of the first reflected light RL1 and the second reflected light RL2-1 differs from the calculated distance between the positions of entry of the first reflected light RL1 and the second reflected light RL2-2, the operation unit 531 may determine that the symmetry of the projections C is inappropriate.

The operation unit 531 may determine the appropriateness of the symmetry of the projections C, which corresponds to the shape of the projections C, based on the positions of entry into the photosensitive surface 3a of the first reflected light RL1, the second reflected light RL2-1, and the second reflected light RL2-2.

In this case, the operation unit 531 calculates the position corresponding to the first reflected light RL1 (the representative position of the first reflected light RL1) and the positions corresponding to the second reflected light RL2-1 and RL2-2 (the representative positions of the second reflected light RL2) on the image represented by the intensity distribution data, as the positions of entry of the reflected light, in a manner similar to that described above.

The operation unit 531 may then determine the appropriateness of the shape of the riblet structure (e.g., the appropriateness of the symmetry of the projections C), based on the difference (distance) between the calculated position of entry into the photosensitive surface 3a of the first reflected light RL1 and a reference position of entry of the first reflected light RL1, the difference (distance) between the calculated position of entry into the photosensitive surface 3a of the second reflected light RL2-1 and a reference position of entry of the second reflected light RL2-1, and the difference (distance) between the calculated position of entry into the photosensitive surface 3a of the second reflected light RL2-2 and a reference position of entry of the second reflected light RL2-2.

For example, when at least one of the difference between the position of entry of the first reflected light RL1 and the reference position of entry of the first reflected light RL1, the difference between the position of entry of the second reflected light RL2-1 and the reference position of entry of the second reflected light RL2-1, and the difference between the position of entry of the second reflected light RL2-2 and the reference position of entry of the second reflected light RL2-2 exceeds a predetermined threshold, the operation unit 531 may determine that the shape of the riblet structure (e.g., the symmetry of the projections C) is inappropriate.

It may also be said that the reference positions of entry are standard data for inspecting the appropriateness of a riblet structure. The above reference positions of entry may be reference positions of entry into the photosensitive surface 3*a* of second reflected light RL2-1 and RL2-2 reflected by actually irradiating an object surface OS having a riblet structure whose shape can be regarded as non-defective (e.g., one slope T1 and the other slope T2 of each projection C are symmetrical about the third direction D3) with light.

The above reference positions of entry may be reference positions of entry into the photosensitive surface 3*a* of first reflected light RL1, second reflected light RL2-1, and second reflected light RL2-2 calculated by simulation.

It may also be said that comparison of at least one of the difference between the position of entry of the first reflected light RL1 and the reference position of entry of the first reflected light RL1, the difference between the position of entry of the second reflected light RL2-1 and the reference position of entry of the second reflected light RL2-1, and the difference between the position of entry of the second reflected light RL2-2 and the reference position of entry of the second reflected light RL2-2 with the predetermined threshold is to inspect the riblet structure by determining whether at least one of the positions of the first reflected light RL1, the second reflected light RL2-1, and the second reflected light RL2-2 on the image represented by the intensity distribution data (i.e., intensity distribution) is in a reference area of at least one of the positions of the first reflected light RL1, the second reflected light RL2-1, and the second reflected light RL2-2.

The target for determination of appropriateness by the operation unit 531 is not limited to the symmetry of the projections C. For example, the operation unit 531 may determine the appropriateness of at least one of the roundness of the projections C, the apical angle A of the projections C, the height H of the projections C, and the pitch P in the second direction D2 of the projections C, which correspond to the shape of the riblet structure (the shape of the projections C), by the above process.

The operation unit 531 may determine the appropriateness of the shape of the riblet structure (e.g., the appropriateness of the symmetry of the projections C, which corresponds to the shape of the projections C of the riblet structure), based on the positions of entry into the photosensitive surface 3*a* of the second reflected light RL2-1 and RL2-2, without using the position of entry into the photosensitive surface 3*a* of the first reflected light RL1.

In this case, the operation unit 531 calculates the positions corresponding to the second reflected light RL2-1 and RL2-2 (the representative positions of the second reflected light RL2) on the image represented by the intensity distribution data, as the positions of entry of the reflected light, in a manner similar to that described above.

The operation unit 531 may then determine the appropriateness of the shape of the riblet structure (e.g., the appropriateness of the symmetry of the projections C) by comparing the difference (distance) between the calculated position of entry into the photosensitive surface 3*a* of the second reflected light RL2-1 and a reference position of entry of the second reflected light RL2-1 with the difference (distance) between the calculated position of entry into the photosensitive surface 3*a* of the second reflected light RL2-2 and a reference position of entry of the second reflected light RL2-2.

For example, when the difference or ratio between the difference between the calculated position of entry into the photosensitive surface 3*a* of the second reflected light RL2-1 and the reference position of entry of the second reflected light RL2-1 and the difference between the calculated position of entry into the photosensitive surface 3*a* of the second reflected light RL2-2 and the reference position of entry of the second reflected light RL2-2 exceeds a predetermined threshold, the operation unit 531 may determine that the shape of the riblet structure is inappropriate.

It may also be said that the reference positions of entry are standard data for inspecting the appropriateness of a riblet structure. The above reference positions of entry may be reference positions of entry into the photosensitive surface 3*a* of second reflected light RL2-1 and RL2-2 reflected by actually irradiating an object surface OS having a riblet structure whose shape can be regarded as non-defective with light.

These reference positions of entry may be reference positions of entry into the photosensitive surface 3*a* of second reflected light RL2-1 and RL2-2 calculated by simulation.

When the value of the difference between the calculated position of entry into the photosensitive surface 3*a* of the second reflected light RL2-1 and the reference position of entry of the second reflected light RL2-1 differs from the value of the difference between the calculated position of entry into the photosensitive surface 3*a* of the second reflected light RL2-2 and the reference position of entry of the second reflected light RL2-2, the operation unit 531 may determine that the shape of the riblet structure (e.g., the symmetry of the projections C) is inappropriate.

It may be said that the symmetry of the projections C is, for example, that of one slope T1 and the other slope T2 of a pair of slopes with respect to the third direction D3. For example, when it is determined by the operation unit 531 that the symmetry is inappropriate, as described above, it may be said that the slopes T1 and T2 are in a state of asymmetry about the third direction D3 (symmetry breaking).

It may also be said that the symmetry of the projections C is the relationship between the angle formed between one slope T1 and the regions R and the angle formed between the other slope T2 and the regions R. When these angles differ, it may be said that the slopes T1 and T2 are in a state of asymmetry about the third direction D3 (symmetry breaking).

When a region R adjoining one slope T1 and a region R adjoining the other slope T2 are included in the same plane or in two parallel planes, respectively, the direction of the second reflected light RL2-1 reflected by one slope T1 and the direction of the second reflected light RL2-2 reflected by the other slope T2 indicate the inclination(s) of the plane(s) including the regions R with respect to the normal direction. The distances between the position corresponding to the first reflected light RL1 and the positions corresponding to the second reflected light RL2-1 and RL2-2 respectively correspond to the directions of the second reflected light RL2-1 and RL2-2.

The operation unit 531 may determine the symmetry of one slope and the other slope of the pair of slopes, based on the distances between the position corresponding to the first reflected light RL1 and the positions corresponding to the second reflected light RL2-1 and RL2-2. For example, when the ratio or difference between the distance between the positions corresponding to the first reflected light RL1 and the second reflected light RL2-1 and the distance between the positions corresponding to the first reflected light RL1 and the second reflected light RL2-2 exceeds a predetermined threshold, the operation unit 531 may determine that the symmetry of the slopes of the projections C corresponding to the received-light data is inappropriate.

The operation unit 531 may inspect the riblet structure (e.g., determine the appropriateness of the symmetry of the projections C, which corresponds to the shape of the projections C), based on the positions of entry into the photosensitive surface 3*a* of the second reflected light RL2-1 and RL2-2.

In this case, the operation unit 531 calculates the positions corresponding to the second reflected light RL2-1 and RL2-2 (the representative positions of the second reflected light RL2) on the image represented by the intensity distribution data, as the positions of entry of the reflected light, in a manner similar to that described above.

The operation unit 531 may then inspect the riblet structure, based on the difference (distance) between the calculated position of entry into the photosensitive surface 3*a* of the second reflected light RL2-1 and a reference position of entry of the second reflected light RL2-1 and the difference (distance) between the calculated position of entry into the photosensitive surface 3*a* of the second reflected light RL2-2 and a reference position of entry of the second reflected light RL2-2.

For example, when at least one of the difference between the position of entry of the second reflected light RL2-1 and the reference position of entry of the second reflected light RL2-1 and the difference between the position of entry of the second reflected light RL2-2 and the reference position of entry of the second reflected light RL2-2 exceeds a predetermined threshold, the operation unit 531 may determine that the shape of the riblet structure is inappropriate.

It may also be said that the reference positions of entry are standard data for inspecting the appropriateness of a riblet structure. The above reference positions of entry may be reference positions of entry into the photosensitive surface 3*a* of second reflected light RL2-1 and RL2-2 reflected by actually irradiating an object surface OS having a riblet structure whose shape can be regarded as non-defective with light.

The above reference positions of entry may be reference positions of entry into the photosensitive surface 3*a* of second reflected light RL2-1 and RL2-2 calculated by simulation.

It may also be said that comparison of the difference between the position of entry of the second reflected light RL2-1 and the reference position of entry of the second reflected light RL2-1 and the difference between the position of entry of the second reflected light RL2-2 and the reference position of entry of the second reflected light RL2-2 with the predetermined threshold is to inspect the riblet structure by determining whether the positions of the second reflected light RL2-1 and RL2-2 on the image represented by the intensity distribution data (i.e., intensity distribution) are respectively in reference areas of the positions of the second reflected light RL2-1 and RL2-2.

The regions R may be worn by friction with a fluid on the object surface OS or chipped by collision with a foreign object. The operation unit 531 may inspect the appropriateness of the shape of the regions R, which corresponds to the shape of the riblet structure.

For example, the operation unit 531 may inspect the appropriateness of the shape of the regions R, based on data indicating intensity distribution of light condensed by the condensing optical system 2 (data based on light reflected from the riblet structure to be inspected) outputted from the photodetector 3.

In this case, the operation unit 531 may determine the appropriateness of the shape of the regions R by comparing the data indicating intensity distribution with data indicating reference intensity distribution. It may also be said that the data indicating reference intensity distribution is standard data for inspecting the appropriateness of a riblet structure.

The reference intensity distribution may be reference intensity distribution data of light reflected by actually irradiating an object surface OS having projections C and regions R whose shape can be regarded as non-defective with light. This reference intensity distribution data may be calculated by simulation, such as ray tracing.

The operation unit 531 may determine the appropriateness of the shape of the regions R, using one of the above processes for determining the appropriateness of the shape of a riblet structure (the appropriateness of the shape of the projections C). The operation unit 531 may determine the appropriateness of the shapes of the projections C and the regions R, using one of the above processes for determining the appropriateness of the shape of a riblet structure (the appropriateness of the shape of the projections C).

On the regions R may get caught a foreign object. The shape of the regions R may include a shape changed by a foreign object being caught.

The operation unit 531 may inspect the appropriateness of the riblet structure by comparing data indicating intensity distribution outputted from the photodetector 3 (data based on light reflected from the riblet structure to be inspected) with at least one of non-defective standard data and defective standard data. The operation unit 531 may determine the appropriateness of the shape of the projections C of the object surface OS, as inspection of the appropriateness of the riblet structure, by comparing data indicating intensity distribution outputted from the photodetector 3 with at least one of the non-defective standard data and the defective standard data.

The non-defective standard data is data indicating intensity distribution of light reflected by light irradiation of an object surface OS having a riblet structure (projections C and regions R) determined to be non-defective (at least one of first reflected light RL1, second reflected light RL2-1, and second reflected light RL2-2). The defective standard data is data indicating intensity distribution of light reflected by light irradiation of an object surface OS having a riblet structure (projections C and regions R) determined to be defective (at least one of first reflected light RL1, second reflected light RL2-1, and second reflected light RL2-2).

It may also be said that at least one of at least one piece of non-defective standard data and at least one piece of defective standard data is standard data for inspecting the appropriateness of a riblet structure. At least one of at least one piece of non-defective standard data and at least one piece of defective standard data may be prestored in the memory 52.

For example, the non-defective standard data may include data indicating intensity distribution of light reflected by light irradiation of an object surface OS having projections C of which the roundness of the apexes, which corresponds to the shape of the projections C, is determined to be non-defective. For example, the non-defective standard data may include data indicating intensity distribution of light reflected by light irradiation of an object surface OS having projections C of which the symmetry (symmetry of the slopes T1 and T2 with respect to the third direction D3), which corresponds to the shape of the projections C, is determined to be non-defective. For example, the non-defective standard data may include data indicating intensity distribution of light reflected by light irradiation of an object surface OS having projections C of which the apical angle A, which corresponds to the shape of the projections C, is determined to be non-defective. For example, the non-defective standard data may include data indicating intensity distribution of light reflected by light irradiation of an object surface OS having projections C of which the height H, which corresponds to the shape of the projections C, is determined to be non-defective. For example, the non-defective standard data may include data indicating intensity distribution of light reflected by light irradiation of an object surface OS having projections C of which the pitch P in the second direction D2, which corresponds to the shape of the projections C, is determined to be non-defective.

The operation unit 531 may determine the appropriateness of at least one of the roundness of the apexes of the projections C, the symmetry of the projections C, the apical angle A of the projections C, the height H of the projections C, and the pitch P in the second direction D2 of the projections C, which correspond to the shape of the projections C, by comparing data indicating intensity distribution outputted from the photodetector 3 with the non-defective standard data. For example, when data indicating intensity distribution outputted from the photodetector 3 differs from the non-defective standard data (i.e., when intensity distribution outputted from the photodetector 3 differs from intensity distribution indicated by the non-defective standard data), the operation unit 531 may determine that the shape of the projections C is inappropriate.

Similarly to the non-defective standard data, the defective standard data may include data indicating intensity distribution of light reflected by light irradiation of an object surface OS having projections C of which the roundness of the apexes of the projections C, the symmetry of the projections C, the apical angle A of the projections C, the height H of the projections C, or the pitch P in the second direction D2 of the projections C, which correspond to the shape of the projections C, is determined to be defective.

The operation unit 531 may determine the appropriateness of at least one of the roundness of the apexes of the projections C, the symmetry of the projections C, the apical angle A of the projections C, the height H of the projections C, and the pitch P in the second direction D2 of the projections C, which correspond to the shape of the projections C, by comparing data indicating intensity distribution outputted from the photodetector 3 with the defective standard data. For example, when data indicating intensity distribution outputted from the photodetector 3 is the same as the defective standard data (i.e., when intensity distribution outputted from the photodetector 3 is the same as intensity distribution indicated by the defective standard data), the operation unit 531 may determine that the shape of the projections C is inappropriate.

The operation unit 531 may identify a virtual line HL1 from the positions of the regions corresponding to the first reflected light RL1 and the second reflected light RL2 in data indicating intensity distribution outputted from the photodetector 3 (on an image represented by the intensity distribution data), and make a luminance profile indicating the luminance of pixels on the virtual line HL1. The operation unit 531 may then compare the luminance profile made by using received-light data with a luminance profile made similarly from the non-defective standard data and/or a luminance profile made similarly from the defective standard data, thereby determining the appropriateness of the shape of the projections C.

The non-defective standard data and the defective standard data are data indicating intensity distribution outputted by the optical device 1 of the present embodiment actually irradiating, with light, an object surface OS having a riblet structure of which the appropriateness of shape is determined in advance. The non-defective standard data and the defective standard data may be data calculated by simulation, such as ray tracing. For example, the non-defective standard data and the defective standard data may be simulation data indicating intensity distribution of condensed reflected light under the assumption that an object surface OS having a riblet structure of which the appropriateness of shape is determined in advance is irradiated with light.

The operation unit 531 may determine the appropriateness of the shape of the riblet structure of the object surface OS by inputting data indicating intensity distribution outputted from the photodetector 3 (data based on light reflected from the riblet structure to be inspected) into a classifier that has been trained to determine the appropriateness of the shape of a riblet structure represented by inputted data.

The classifier may be, for example, a convolutional neural network (hereafter "CNN") including convolution layers connected in series from an input side toward an output side. A CNN that has been trained by inputting a large number of pieces of non-defective standard data and defective standard data used as training data operates as a classifier that determines the appropriateness of the shape of a riblet structure.

The classifier may be trained in advance to output the result of determination of the appropriateness of at least one of the roundness of the apexes of the projections C, the symmetry of the projections C, the apical angle A of the projections C, the height H of the projections C, and the pitch P in the second direction D2 of the projections C, which correspond to the shape of the projections C, in response to input of data indicating intensity distribution outputted from the photodetector 3 (data based on light reflected from the riblet structure to be inspected).

The operation unit 531 obtains the result of determination of the appropriateness of at least one of the roundness of the apexes of the projections C, the symmetry of the projections C, the apical angle A of the projections C, the height H of the projections C, and the pitch P in the second direction D2 of the projections C outputted from the classifier by inputting data indicating intensity distribution outputted from the photodetector 3 into the classifier. It may be said that the operation unit 531 determines the appropriateness of the shape of the projections C by obtaining the result of determination of the appropriateness of the above.

The classifier may be trained to determine the appropriateness of the shape of the regions R in response to input of data indicating intensity distribution outputted from the photodetector 3 (data based on light reflected from the riblet structure to be inspected). The operation unit 531 may obtain the result of determination of the appropriateness of the shape of the regions R outputted from the classifier by inputting data indicating intensity distribution outputted from the photodetector 3 (data based on light reflected from the riblet structure to be inspected) into the classifier.

The detection unit 532 may detect the inclination of the optical axis AX of the condensing optical system 2 relative to the object surface OS, based on the distance between a reference position RP and the position of the first reflected light RL1 in data indicating intensity distribution outputted from the photodetector 3 (on an image represented by the intensity distribution data).

The reference position RP indicates the position on the photosensitive surface 3*a* to which light entering parallel to the optical axis AX of the condensing optical system 2 and reflected once by the object surface OS (e.g., by the regions R) with the normal direction of the object surface OS (e.g., the normal direction of the regions R) being parallel to the optical axis AX of the condensing optical system 2 is condensed by the condensing optical system 2.

The condensing optical system 2 is set on a reference plane so that the optical axis AX is perpendicular to the reference plane. The reference position RP may be a position on the photosensitive surface 3*a* to which light radiated perpendicularly to the reference plane is condensed by the condensing optical system 2. The reference position RP can be set, for example, using a collimator.

Figure 11:
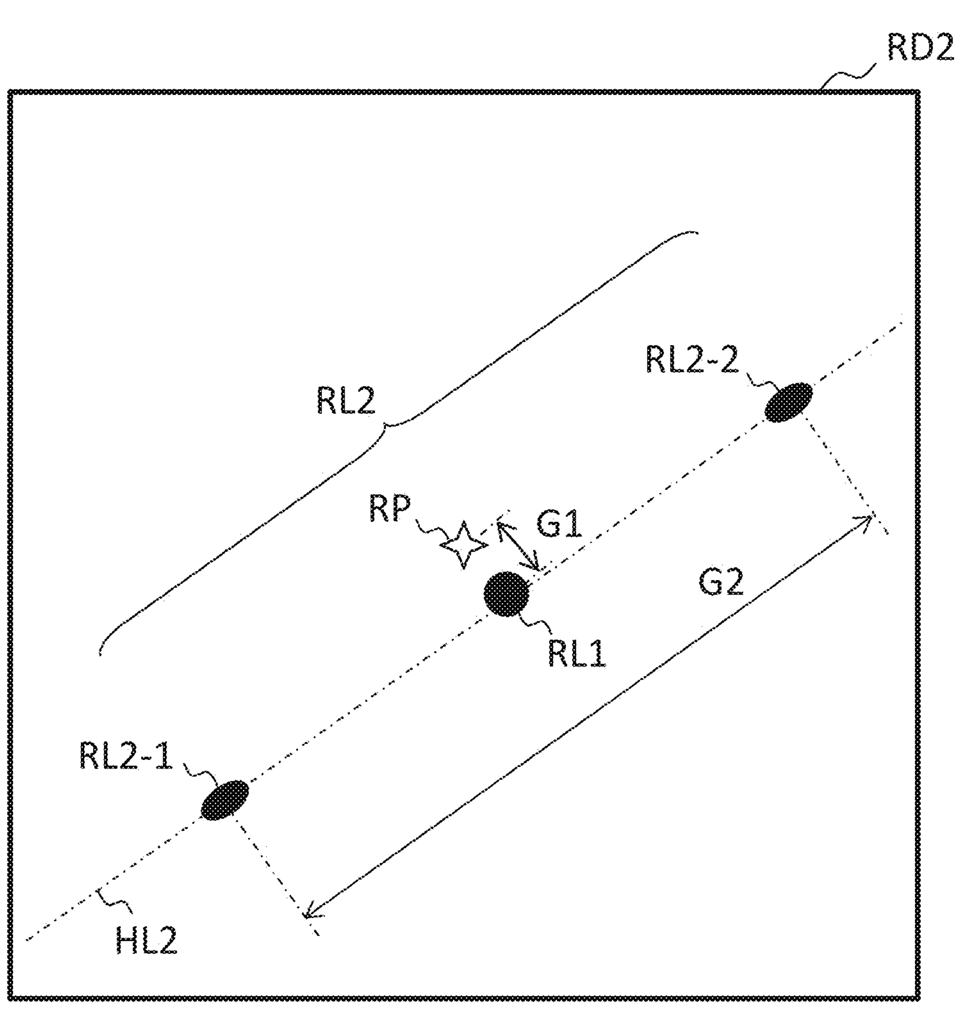
FIG. 11 schematically illustrates second received-light data.

FIG. 11 schematically illustrates second received-light data.

In second received-light data RD2 (on an image represented by intensity distribution data), which is another example of received-light data, the first reflected light RL1 and the second reflected light RL2-1 and RL2-2 are shown at positions on a virtual line HL2. The virtual line HL2 is a distance G1 away from the reference position RP. In other words, the first reflected light RL1 is shown at a position separated by the distance G1 from the reference position RP. The pair of second reflected light RL2-1 and RL2-2 is shown at positions separated by a distance G2.

The detection unit 532 may detect that the optical axis AX of the condensing optical system 2 inclines more with respect to the object surface OS as the distance G1 between the position of the first reflected light RL1 and the reference position RP on the image represented by the intensity distribution data is greater.

The relationship between the distance G1 and the inclination of the optical axis AX of the condensing optical system 2 with respect to the object surface OS may be determined in advance. In this case, the detection unit 532 may calculate the inclination of the optical axis AX of the condensing optical system 2 with respect to the object surface OS, based on the distance G1 between the position of the first reflected light RL1 and the reference position RP on the image represented by the intensity distribution data.

The detection unit 532 may detect the direction in which the optical axis AX of the condensing optical system 2 inclines with respect to the object surface OS, depending on the position of the first reflected light RL1 on the image represented by the intensity distribution data relative to the reference position RP.

In the second received-light data RD2 (on the image represented by the intensity distribution data), the first reflected light RL1 is separated from the reference position RP in the direction perpendicular to the virtual line HL2 perpendicular to the first direction D1, in which the projections C extend on the object surface OS. In this case, the detection unit 532 may detect that the optical axis of the condensing optical system 2 inclines in the first direction D1 with respect to the object surface OS. In other words, the detection unit 532 may detect the direction in which the optical axis of the condensing optical system 2 inclines with respect to the object surface OS.

The above process of the detection unit 532 may be executed by the operation unit 531. The optical device 1 need not necessarily include the detection unit 532.

The measurement unit 533 measures a to-be-measured surface having a riblet structure. The object surface OS is an example of the to-be-measured surface that is a target for measurement by the measurement unit 533. The measurement unit 533 outputs a value related to the shape of the riblet structure that the object surface OS has, based on received-light data corresponding to the object surface OS.

The received-light data corresponding to the object surface OS is data indicating the result of reception of light reflected by the irradiation region IR on the object surface OS and condensed by the condensing optical system 2 (e.g., at least one of the first reflected light RL1 and the second reflected light) in response to irradiation of the irradiation region IR with light from the condensing optical system 2.

It may also be said that data indicating the result of reception of light is data indicating intensity distribution of light condensed by the condensing optical system 2 (e.g., at least one of the first reflected light RL1 and the second reflected light). The data indicating intensity distribution may be two-dimensional image data.

It may also be said that the data indicating intensity distribution outputted from the photodetector 3 is data based on light reflected from the riblet structure to be measured. The photodetector 3 may be a device having one-dimensionally arrayed pixels, such as a line sensor, and the data indicating intensity distribution may be one-dimensional image data.

In other words, the measurement unit 533 measures the riblet structure, based on intensity distribution data outputted from the photodetector 3.

The measurement unit 533 may calculate a value related to the shape of the riblet structure, as measurement of the riblet structure, based on intensity distribution data outputted from the photodetector 3. For example, the measurement unit 533 may calculate a value indicating at least one of the apical angle A of the projections C, the height H of the projections C, the radius of curvature of the apexes of the projections C, the curvature of the apexes of the projections C, and the pitch P in the second direction of the projections, as the value related to the shape of the riblet structure.

The measurement unit 533 may calculate the distance between the positions of entry into the photosensitive surface 3*a* of the photodetector 3 of the second reflected light RL2-1 and RL2-2, and calculate the value related to the shape of the riblet structure, based on the calculated distance. For example, the measurement unit 533 may calculate a value indicating the apical angle A of the projections C, as the value related to the shape of the riblet structure, based on the calculated distance between the positions of entry of the second reflected light RL2-1 and RL2-2.

The distance between the positions of entry of the second reflected light RL2-1 and RL2-2 reflected by the irradiation region IR in response to irradiation with light and entering the photosensitive surface 3*a* increases with the apical angle A of the projections C. Thus the apical angle A of the projections C can be calculated based on the distance between the positions of entry of the second reflected light RL2-1 and RL2-2 incident on the photosensitive surface 3*a*.

Similarly to the above process of the operation unit 531, the measurement unit 533 identifies regions corresponding to the second reflected light RL2-1 and RL2-2 in data indicating intensity distribution outputted from the photodetector 3 (on an image represented by the intensity distribution data). For example, the measurement unit 533 may extract pixels whose luminance values are greater than or equal to a predetermined threshold on the image represented by the intensity distribution data, and group a set of the extracted pixels by clustering, thereby identifying the regions corresponding to the second reflected light RL2-1 and RL2-2 on the image represented by the intensity distribution data. The measurement unit 533 may identify the regions corresponding to the second reflected light RL2-1 and RL2-2 on the image represented by the intensity distribution data, using template matching.

For each of the identified regions corresponding to second reflected light RL2-1 and RL2-2 on the image represented by the intensity distribution data, the measurement unit 533 calculates at least one of the position of a pixel having maximum luminance and the centroid position of the region, as a representative position of the reflected light, similarly to the above process of the operation unit 531. The position corresponding to the second reflected light RL2-1 on the image represented by the intensity distribution data (the representative position of the second reflected light RL2-1) calculated by the measurement unit 533 indicates the position of entry of the second reflected light RL2-1 on the photosensitive surface 3*a*. The position corresponding to the second reflected light RL2-2 on the image represented by the intensity distribution data (the representative position of the second reflected light RL2-2) calculated by the measurement unit 533 indicates the position of entry of the second reflected light RL2-2 on the photosensitive surface 3*a*.

Based on the identified position corresponding to the second reflected light RL2-1 (the representative position of the second reflected light RL2-1) and the identified position corresponding to the second reflected light RL2-2 (the representative position of the second reflected light RL2-2) on the image represented by the intensity distribution data, the measurement unit 533 calculates the distance between the positions corresponding to the second reflected light RL2-1 and RL2-2 on the image represented by the intensity distribution data, similarly to the above process of the operation unit 531.

The distance between the positions corresponding to the second reflected light RL2-1 and RL2-2 on the image represented by the intensity distribution data indicates the distance between the positions of entry of the second reflected light RL2-1 and RL2-2 on the photosensitive surface 3*a*. The distance between the positions corresponding to the second reflected light RL2-1 and RL2-2 on the image represented by the intensity distribution data is, for example, the distance G2 in FIG. 11.

Data of the relationship between the distance between the positions of entry of the second reflected light RL2-1 and RL2-2 incident on the photosensitive surface 3*a* and the apical angle A of the projections C may be determined in advance. This data of the relationship between the distance of the second reflected light RL2 and the apical angle A of the projections C may be function data or table data, such as a look-up table.

It may also be said that this data of the relationship between the distance of the second reflected light RL2 and the apical angle A of the projections C is reference data for measuring a riblet structure. The reference data for measuring a riblet structure may be prestored in the memory 52. It may also be said that the reference data for measuring a riblet structure is standard data for measuring a riblet structure.

The measurement unit 533 may calculate a value indicating the apical angle A of the projections C, as the value related to the shape of the riblet structure, based on the calculated distance between the positions of entry of the second reflected light RL2-1 and RL2-2 and the reference data for measuring a riblet structure. For example, the measurement unit 533 may calculate a value indicating the apical angle A of the projections C corresponding to the distance between the positions of entry of the second reflected light RL2-1 and RL2-2, by referring to the reference data for measuring a riblet structure.

The target for measurement by the measurement unit 533 (target for calculation of a value related to shape) is not limited to the apical angle A of the projections C. For example, the measurement unit 533 may calculate the value of at least one of the height H of the projections C, the radius of curvature of the apexes of the projections C, the curvature of the apexes of the projections C, and the pitch P in the second direction D2 of the projections C, which correspond to the shape of the riblet structure, by the above process.

The measurement unit 533 may also use the intensity of light emitted from the light source LS outputted from the light intensity measurement device to measure the riblet structure.

The measurement unit 533 may calculate a value related to the shape of the riblet structure, based on the distance between the position of entry into the photosensitive surface 3*a* of one of the first reflected light RL1, the second reflected light RL2-1, and the second reflected light RL2-2 and the position of entry into the photosensitive surface 3*a* of another of them, instead of the distance between the second reflected light RL2-1 and RL2-2 on the photosensitive surface 3*a*.

In a manner similar to that described above, reference data for measuring a riblet structure (data of the relationship between the shape of a riblet structure and the distance between the position of entry into the photosensitive surface 3*a* of one of the first reflected light RL1, the second reflected light RL2-1, and the second reflected light 2-2 and the position of entry into the photosensitive surface 3*a* of another of them) may be determined in advance. In this case, the measurement unit 533 may calculate a value related to the shape of the riblet structure, based on the reference data for measuring a riblet structure and the distance between the position of entry into the photosensitive surface 3*a* of one of the first reflected light RL1, the second reflected light RL2-1, and the second reflected light RL2-2 and the position of entry into the photosensitive surface 3*a* of another of them. As the process related to calculation of the distance between the positions of entry of the reflected light can be used the above process of the operation unit 531 or the measurement unit 533.

The measurement unit 533 may calculate a value related to the shape of the riblet structure, based on the position of entry of at least one of the first reflected light RL1, the second reflected light RL2-1, and the second reflected light RL2-2 on the photosensitive surface 3*a*.

In a manner similar to that described above, reference data for measuring a riblet structure (data of the relationship between the shape of a riblet structure and the position of entry of at least one of the first reflected light RL1, the second reflected light RL2-1, and the second reflected light RL2-2) may be determined in advance. In this case, the measurement unit 533 may calculate a value related to the shape of the riblet structure, based on the reference data for measuring a riblet structure and the position of entry of at least one of the first reflected light RL1, the second reflected light RL2-1, and the second reflected light RL2-2. As the process related to calculation of the position of entry of the reflected light can be used the above process of the operation unit 531 or the measurement unit 533.

The measurement unit 533 may calculate a value related to the shape of the riblet structure, based on the intensity of at least one of the first reflected light RL1, the second reflected light RL2-1, and the second reflected light RL2-2.

In a manner similar to that described above, reference data for measuring a riblet structure (data of the relationship between the shape of a riblet structure and the intensity of at least one of the first reflected light RL1, the second reflected light RL2-1, and the second reflected light RL2-2) may be determined in advance. In this case, the measurement unit 533 may calculate a value related to the shape of the riblet structure, based on the reference data for measuring a riblet structure and the intensity of at least one of the first reflected light RL1, the second reflected light RL2-1, and the second reflected light RL2-2. As the process related to calculation of the intensity of the reflected light can be used the above process of the operation unit 531.

The measurement unit 533 may calculate a value related to the shape of the riblet structure by comparing data indicating intensity distribution outputted from the photodetector 3 with multiple pieces of shape standard data. The pieces of shape standard data respectively indicate intensity distribution of light reflected by light irradiation of object surfaces OS having riblet structures of different shapes (e.g., at least one of first reflected light RL1, second reflected light RL2-1, and second reflected light RL2-2). The pieces of shape standard data are prestored in the memory 52.

For example, of the pieces of shape standard data, the measurement unit 533 may identify one (intensity distribution indicated by the shape standard data) that is the same as or similar to data indicating intensity distribution outputted from the photodetector 3 (intensity distribution indicated by data outputted from the photodetector 3), and calculate a value of the shape corresponding to the identified data.

It may also be said that the pieces of shape standard data are reference data for measuring a riblet structure. For example, the pieces of shape standard data may indicate intensity distribution of reflected light (e.g., at least one of first reflected light RL1, second reflected light RL2-1, and second reflected light RL2-2) caused by light irradiation of object surfaces OS having riblet structures that differ in at least one of the apical angle A of the projections C, the height H of the projections C, the radius of curvature of the apexes of the projections C, the curvature of the apexes of the projections C, and the pitch P in the second direction D2 of the projections C, which correspond to the shape of the riblet structure.

The measurement unit 533 may calculate a value related to at least one of the apical angle A of the projections C, the height H of the projections C, the radius of curvature of the apexes of the projections C, the curvature of the apexes of the projections C, and the pitch Pin the second direction D2 of the projections C, which correspond to the shape of the riblet structure, by comparing data indicating intensity distribution outputted from the photodetector 3 with the pieces of shape standard data.

The shape standard data is data indicating intensity distribution of light reflected by an object surface OS having a riblet structure of a predetermined shape and condensed by the condensing optical system 2 in response to actual irradiation of the object surface OS with light. The shape standard data may be data calculated by simulation, such as ray tracing. For example, the shape standard data may be simulation data indicating intensity distribution of condensed reflected light under the assumption that an object surface OS having a riblet structure of a predetermined shape is irradiated with light. Data indicating intensity distribution of riblet structures of different shapes may be obtained by simulation to make the pieces of shape standard data.

The measurement unit 533 may output a value related to the shape of the riblet structure by inputting data indicating intensity distribution outputted from the photodetector 3 into a classifier that has been trained to output a value related to the shape of a riblet structure of an object surface OS represented in inputted data. The classifier may be, for example, a CNN. A CNN that has been trained by inputting shape standard data corresponding to various shapes of riblet structures and values related to the shapes of the riblet structures corresponding to the respective pieces of shape standard data as training data operates as a classifier that outputs a value related to the shape of a riblet structure.

For example, the classifier may be trained in advance to output the result of calculation of the value of at least one of the apical angle A of the projections C, the height H of the projections C, the radius of curvature of the apexes of the projections C, the curvature of the apexes of the projections C, and the pitch P in the second direction D2 of the projections C, which correspond to the shape of the riblet structure, in response to input of data indicating intensity distribution outputted from the photodetector 3. The measurement unit 533 obtains the result of calculation of the value of at least one of the apical angle A of the projections C, the height H of the projections C, the radius of curvature of the apexes of the projections C, the curvature of the apexes of the projections C, and the pitch P in the second direction D2 of the projections C outputted from the classifier by inputting data indicating intensity distribution outputted from the photodetector 3 into the classifier. It may be said that the measurement unit 533 calculates a value related to the shape of the riblet structure by obtaining the result of calculation.

The process of the measurement unit 533 related to measurement of a riblet structure may be executed by the operation unit 531. For example, the measurement unit 533 may also serve the function of the operation unit 531. In this case, the operation unit 531 may execute the process related to measurement of a riblet structure. For example, the operation unit 531 may execute the process related to inspection of a riblet structure and/or the process related to measurement of a riblet structure. For example, the operation unit 531 may execute the process related to inspection of a riblet structure and/or calculate a value related to the shape of the riblet structure, as the process related to measurement of a riblet structure. The operation unit 531 may calculate the above value related to the shape of the riblet structure, as the result of inspection of the riblet structure. The process of the detection unit 532 related to detection of the inclination of the optical axis AX of the condensing optical system 2 with respect to the object surface OS may be executed by the operation unit 531.

The process of the operation unit 531 related to inspection of a riblet structure may be executed by the measurement unit 533. The process of the detection unit 532 related to detection of the inclination of the optical axis AX of the condensing optical system 2 with respect to the object surface OS may be executed by the measurement unit 533.

Figure 12:
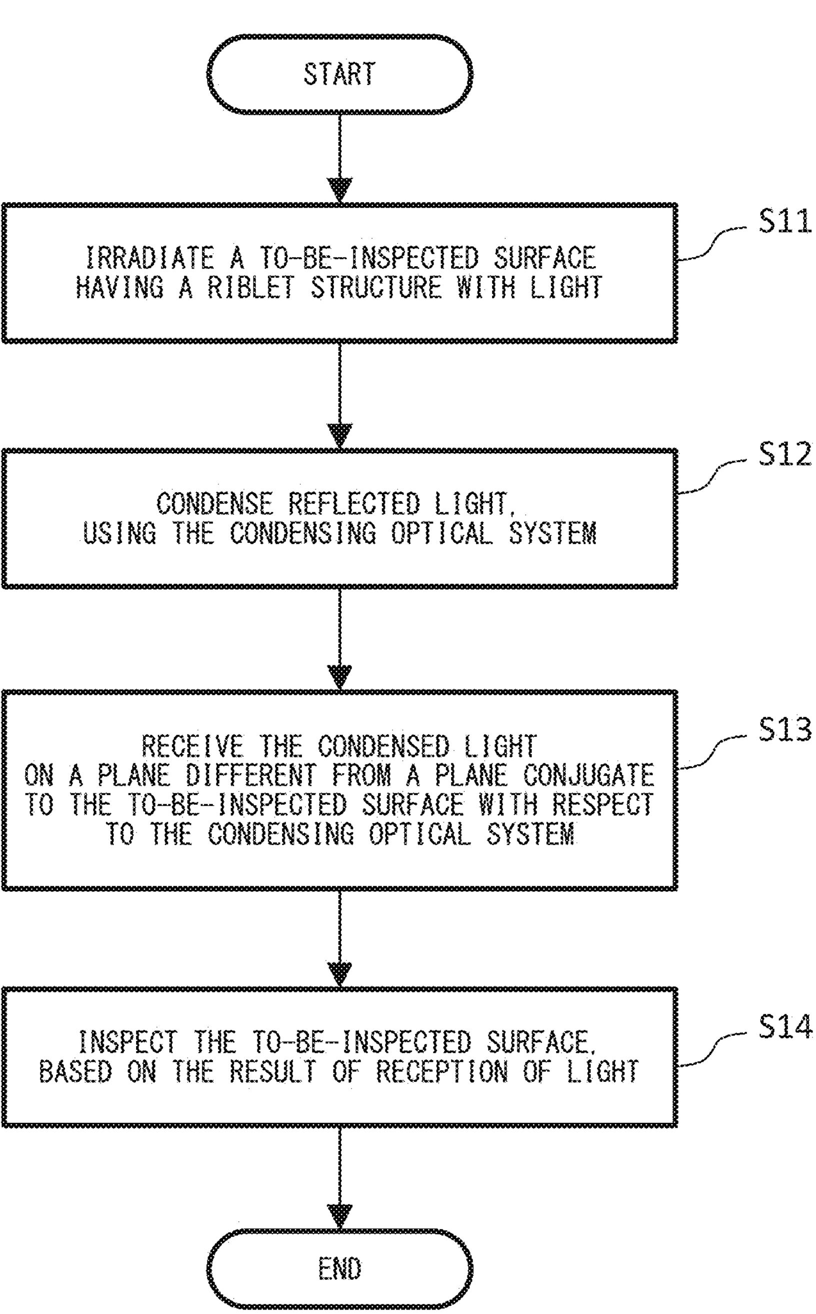
FIG. 12 is a flowchart of a process for inspecting a riblet structure.

FIG. 12 is a flowchart of the process for inspecting a riblet structure. The optical device 1 executes the process for inspecting an object surface OS having a riblet structure formed thereon in accordance with the flowchart described below.

The optical device 1 irradiates a to-be-inspected surface having a riblet structure (object surface OS) with light, using the condensing optical system 2 (step S11).

Next, the optical device 1 condenses first reflected light RL1 reflected once by regions R where projections C are not provided in an irradiation region IR, and second reflected light RL2 reflected at least once by slopes T of projections C and the regions R, using the condensing optical system 2 (step S12).

Next, the optical device 1 receives the condensed light with the photodetector 3 disposed on a plane different from a plane conjugate to the to-be-inspected surface with respect to the condensing optical system 2 (step S13).

The computer 5 communicably connected to the optical device 1 inspects the riblet structure (to-be-inspected surface), based on the result of reception of light (data indicating intensity distribution) (step S14), and terminates the inspection process. For example, the computer 5 (operation unit 531) determines the appropriateness of the shape of the riblet structure, as described above.

By executing the inspection process in this way, the optical device 1 can inspect a riblet structure conveniently.

The processor 53 included in the computer 5 communicably connected to the optical device 1 need not necessarily include some of the functional blocks of the operation unit 531, the detection unit 532, and the measurement unit 533. For example, when the computer 5 includes a processor 53 including at least the measurement unit 533 as its functional blocks, the optical device 1 can operate as a device that measures a riblet structure formed on an object surface. For example, when the computer 5 includes a processor 53 including at least the operation unit 531 as its functional blocks, the optical device 1 can operate as a device that inspects a riblet structure formed on an object surface.

Figure 13:
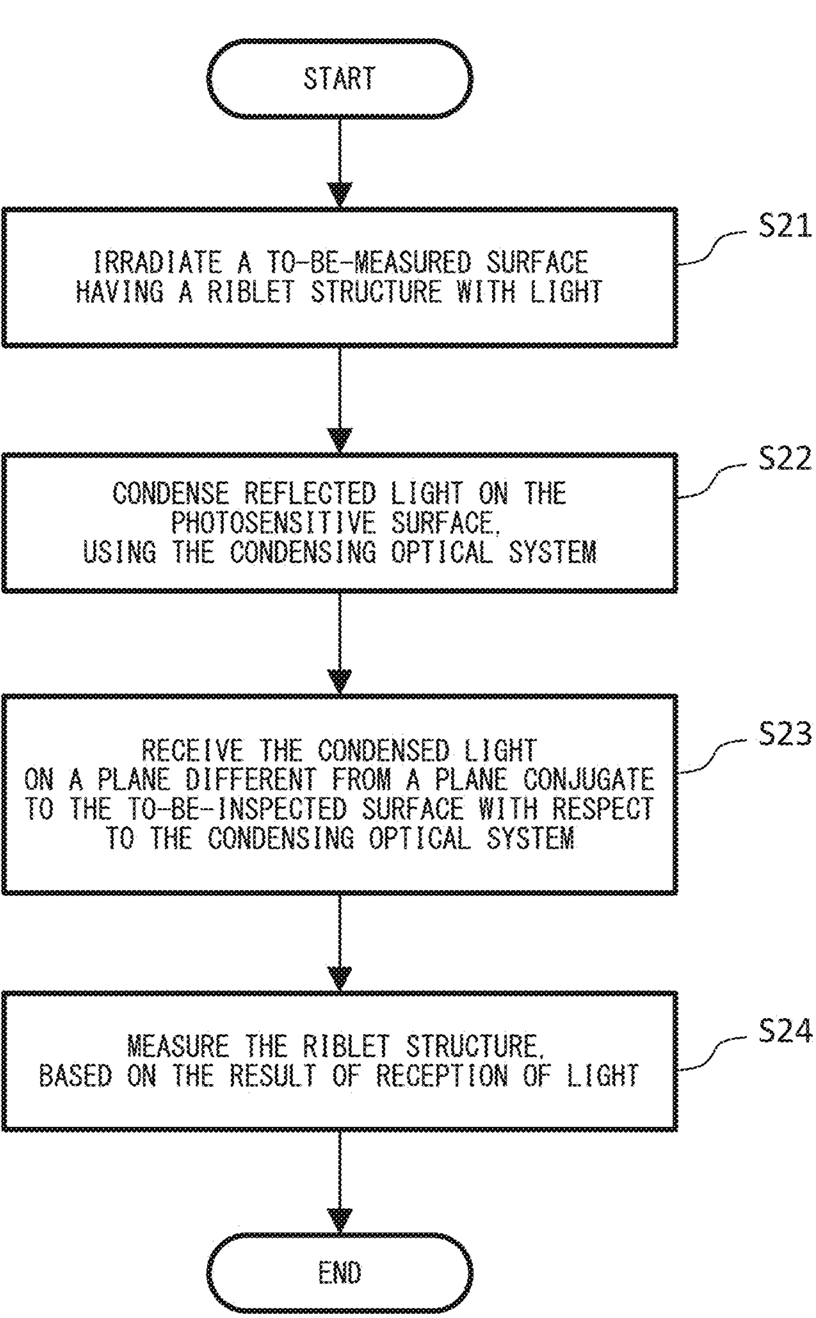
FIG. 13 is a flowchart of a process for measuring a riblet structure.

FIG. 13 is a flowchart of the process for measuring a riblet structure. The optical device 1 executes the process for measuring a riblet structure formed on an object surface OS in accordance with the flowchart described below.

Since steps S21 to S23 in the flowchart of the process for measuring a riblet structure are similar to steps S11 to S13 of the process for inspecting a riblet structure, explanation thereof is omitted herein.

Subsequent to step S23, the computer 5 communicably connected to the optical device 1 measures the riblet structure, based on the result of reception of light (data indicating intensity distribution) (step S24), and terminates the measurement process. For example, the computer 5 (measurement unit 533) calculates a value related to the shape of the riblet structure, as described above.

By executing the measurement process in this way, the optical device 1 can measure a riblet structure conveniently.

The optical device 1 may be mounted on a movable object. Examples of a movable object include a robot, such as a vertically articulated robot, a gimbal, a crewed or uncrewed aircraft, and an unautomated or automated vehicle. In this case, a movable object equipped with the optical device 1 may position the optical device 1 relative to an object surface OS, and execute at least one of the above inspection of a riblet structure, measurement of a riblet structure, and detection of the inclination of the optical device 1 (condensing optical system 2) with respect to the object surface OS. For example, the movable object may bring the contact member 4*a* of the optical device 1 into contact with (position the contact member relative to) the object surface OS, and execute at least one of the above inspection of a riblet structure, measurement of a riblet structure, and detection of the inclination of the optical device 1 with respect to the object surface OS.

The contact member 4*a* of the optical device 1 need not necessarily contact the object surface OS. For example, a movable object may position the optical device 1 so that the contact member 4*a* is disposed away from the object surface OS, and execute at least one of the above inspection of a riblet structure, measurement of a riblet structure, and detection of the inclination of the optical device 1 with respect to the object surface OS. In this case, the optical device 1 need not necessarily include the contact member 4*a*.

While the movable object moves the optical device 1 on the object surface OS, the optical device 1 may execute at least one of the above inspection of a riblet structure, measurement of a riblet structure, and detection of the inclination of the optical device 1 with respect to the object surface OS.

The optical device 1 need not necessarily be mounted on a movable object. For example, an operator may position the optical device 1 (e.g., the housing 4) held by hand relative to an object surface OS, and the optical device 1 may execute at least one of the above inspection of a riblet structure, measurement of a riblet structure, and detection of the inclination of the optical device 1 (condensing optical system 2) with respect to the object surface OS.

For example, the operator may bring the contact member 4*a* of the optical device 1 held by hand into contact with the object surface OS, and the optical device may execute at least one of the above inspection of a riblet structure, measurement of a riblet structure, and detection of the inclination of the optical device 1 with respect to the object surface OS.

The contact member 4*a* of the optical device 1 need not necessarily contact the object surface OS. For example, an operator may position the optical device 1 held by hand so that the contact member 4*a* is disposed away from the object surface OS, and the optical device 1 may execute at least one of the above inspection of a riblet structure, measurement of a riblet structure, and detection of the inclination of the optical device 1 with respect to the object surface OS. In this case, the optical device 1 need not necessarily include the contact member 4*a*.

While the operator moves the optical device 1 held by hand on the object surface OS, the optical device 1 may execute at least one of the above inspection of a riblet structure, measurement of a riblet structure, and detection of the inclination of the optical device 1 with respect to the object surface OS.

At least one of inspection and measurement of a riblet structure may be executed using the optical device 1 and a second optical device. For example, inspection and measurement of a riblet structure may be executed using the optical device 1 and a white interference microscope, which is the second optical device. In this case, the optical device 1 may execute at least one of inspection of a riblet structure (e.g., determination of the appropriateness of the symmetry of projections C) and measurement of a riblet structure (e.g., calculation of the apical angle A of projections C), based on intensity distribution data of second reflected light RL2-1 and/or RL2-2 obtained by the photodetector 3, as described above. The white interference microscope may execute at least one of inspection of the riblet structure (e.g., determination of the appropriateness of the pitch P of the projections C) and measurement of the riblet structure (e.g., calculation of the height H of the projections C), based on the result of detection of light from the object surface OS caused by irradiating the object surface OS with light.

The second optical device is not limited to a white interference microscope, and may be a confocal microscope or another existing device that can execute at least one of inspection and measurement of an object.

In the above description, the optical device 1 inspects and/or measures a riblet structure formed on a surface of a workpiece. However, the optical device 1 may inspect and/or measure any structure of a shape formed on a surface of a workpiece.

An example of the structure is one that generates eddies in the flow of a fluid on the surface of the workpiece. Another example of the structure is one that makes the surface of the workpiece hydrophobic. Another example of the structure is a micrometer- or nanometer-order fine texture structure formed regularly or irregularly (typically, an uneven structure including ridge and groove structures).

The fine texture structure may include at least one of a shark-skin structure and a dimpled structure that have the function of reducing the resistance of a fluid (gas and/or liquid). The fine texture structure may include a lotus leaf surface structure that has at least one of the functions of liquid repellency and self-cleaning (e.g., lotus effect).

The fine texture structure may include at least one of a finely projecting structure having the function of liquid transportation (see U.S. Patent Application Publication No. 2017/0044002), an uneven structure having a lyophilic function, an uneven structure having an antifouling function, a moth-eye structure having at least one of the functions of reduction in reflectance and liquid repellency, an uneven structure that enhances light of only a particular wavelength by interference to exhibit a structural color, a pillar array structure having the function of adhesion using van der Waals force, an uneven structure having the function of reduction in aerodynamic noise, a honeycomb structure having the function of droplet collection, an uneven structure that improves adhesion to a layer formed on the surface, an uneven structure for reducing frictional resistance, an uneven structure for deicing, and the like.

In this case also, a projecting structure forming an uneven structure may have a structure similar to that of the projections constituting the above riblet structure. A groove structure forming an uneven structure may have a structure similar to that of the regions R constituting the above riblet structure. The fine texture structure need not necessarily have a particular function.

Regarding the above embodiment, the following notes will be further disclosed.

[Note A1]

An optical device for inspecting a to-be-inspected surface having a riblet structure in which projections each extending in a first direction are provided in a second direction intersecting the first direction, the optical device including:

a condensing optical system that irradiates an irradiation region on the to-be-inspected surface with light from a light source and that condenses light reflected by the irradiation region; and a photodetector that is disposed on a plane different from a plane conjugate to the to-be-inspected surface with respect to the condensing optical system, and that receives the light condensed by the condensing optical system.

[Note A2]

The optical device according to note A1, wherein the photodetector has a photosensitive surface disposed on the plane different from the conjugate plane, and detects intensity distribution of the light condensed by the condensing optical system.

[Note A3]

The optical device according to note A2, wherein the condensing optical system satisfies the following conditional expression.

$$\gamma > \beta$$

where $\beta$: the angle formed between a normal on the edge of the effective area of a lens surface disposed closest to the to-be-inspected surface in the condensing optical system and the optical axis of the condensing optical system $\gamma$: the maximum angle formed between a light beam received by the photodetector of light beams incident on a lens disposed closest to the to-be-inspected surface in the condensing optical system and the optical axis of the condensing optical system

[Note A4]

The optical device according to note A2 or A3, wherein the condensing optical system satisfies the following conditional expression.

$$y < f \sin \theta$$

where y: the radius of a circle circumscribing the area of light condensed on the photosensitive surface by the condensing optical system f: the focal length of the condensing optical system $\theta$: the angle formed between the light reflected by the irradiation region and the optical axis of the condensing optical system

[Note A5]

The optical device according to any one of notes A2 to A4, further including an operation unit that inspects the riblet structure, based on data indicating the intensity distribution detected by the photodetector.

[Note A6]

The optical device according to note A5, wherein the operation unit inspects the riblet structure by comparing the data indicating the intensity distribution outputted from the photodetector with prestored standard data of intensity distribution.

[Note A7]

The optical device according to note A5 or A6, wherein the light reflected by the irradiation region includes first reflected light reflected once by a region where the projections are not provided in the irradiation region, and second reflected light reflected twice by the region where the projections are not provided in the irradiation region and the projections, and the operation unit inspects the riblet structure by determining whether the positions of the first reflected light and the second reflected light in the intensity distribution are respectively in prestored reference areas of the positions of the first reflected light and the second reflected light.

[Note A8]

An inspection method for inspection of a riblet structure, based on data indicating the intensity distribution outputted from the optical device according to any one of notes A2 to A7.

[Note A9]

The inspection method according to note A8, wherein the inspection includes determining the appropriateness of the shape of the projections, as inspection of the riblet structure, based on the data indicating the intensity distribution.

[Note A10]

The inspection method according to note A9, wherein the light reflected by the irradiation region includes first reflected light reflected once by a region where the projections are not provided in the irradiation region, and second reflected light reflected twice by a portion where the projections are not provided in the irradiation region and the projections, and the inspection includes determining the appropriateness of the shape of the projections, based on the result of comparison between the intensities of the first reflected light incident on the photosensitive surface and the second reflected light incident on the photosensitive surface.

[Note A11]

The inspection method according to note A10, wherein the shape of the projections includes the roundness of the apexes of the projections.

[Note A12]

The inspection method according to any one of notes A9 to A11, wherein the light reflected by the irradiation region includes first reflected light reflected once by a region where the projections are not provided in the irradiation region, and second reflected light reflected twice by the region where the projections are not provided in the irradiation region and the projections, the second reflected light includes second reflected light reflected from the irradiation region in a second reflection direction different from a first reflection direction in which the first reflected light is reflected, and second reflected light reflected from the irradiation region in a third reflection direction different from the first reflection direction and the second reflection direction, and the inspection includes determining the appropriateness of the shape of the projections, based on the distance between the positions of entry into the photosensitive surface of the first reflected light and the second reflected light reflected in the second reflection direction, and the distance between the positions of entry into the photosensitive surface of the first reflected light and the second reflected light reflected in the third reflection direction.

[Note A13]

The inspection method according to note A12, wherein the projections each have a pair of slopes that inclines with respect to a third direction perpendicular to the first direction and the second direction, and that extends in the first direction, and the shape of the projections includes the symmetry of one slope and the other slope of the pair of slopes.

[Note A14]

The inspection method according to any one of notes A9 to A13, wherein the inspection includes determining the appropriateness of the shape of the projections by comparing the data indicating the intensity distribution outputted from the photodetector with at least one of at least one piece of non-defective standard data indicating intensity distribution of light reflected by irradiating the projections having a non-defective shape with light and at least one piece of defective standard data indicating intensity distribution of light reflected by irradiating the projections having a defective shape with light.

[Note A15]

The inspection method according to any one of notes A9 to A14, wherein the inspection includes determining the appropriateness of the shape of the projections by inputting the data indicating the intensity distribution into a classifier that has been trained to determine the appropriateness of the shape of the projections.

[Note A16]

The inspection method according to any one of notes A9 to A15, wherein the inspection includes calculating a value related to the shape of the projections, based on the data indicating the intensity distribution detected by the photodetector.

[Note A17]

The inspection method according to any one of notes A8 to A16, wherein the inspection includes inspecting the riblet structure by comparing the data indicating the intensity distribution outputted from the photodetector with prestored standard data of intensity distribution.

[Note A18]

The inspection method according to any one of notes A8 to A17, wherein the light reflected by the irradiation region includes first reflected light reflected once by a region where the projections are not provided in the irradiation region, and second reflected light reflected twice by the region where the projections are not provided in the irradiation region and the projections, and the inspection includes inspecting the riblet structure by determining whether the positions of the first reflected light and the second reflected light in the intensity distribution are respectively in prestored reference areas of the positions of the first reflected light and the second reflected light.

[Note B1]

An inspection method for inspecting a to-be-inspected surface having a riblet structure in which projections each extending in a first direction are provided in a second direction intersecting the first direction, the inspection method including:

irradiating an irradiation region on the to-be-inspected surface with light;

condensing, with a condensing optical system, light reflected by the irradiation region in response to irradiation with the light;

receiving the condensed light on a plane different from a plane conjugate to the to-be-inspected surface with respect to the condensing optical system; and performing inspection of the riblet structure, based on the result of reception of light.

[Note B2]

The inspection method according to note B1, wherein in the reception of light, the condensed light is received by a photodetector having a photosensitive surface disposed on the plane different from the conjugate plane, and the photodetector detects intensity distribution of the condensed light as the result of reception of light.

[Note B3]

The inspection method according to note B2, wherein the numerical aperture on the to-be-inspected surface side of the condensing optical system is greater than or equal to 0.7.

[Note B4]

The inspection method according to note B2 or B3, wherein the numerical aperture on the to-be-inspected surface side of the condensing optical system is less than or equal to 0.9.

[Note B5]

The inspection method according to any one of notes B2 to B4, wherein the condensing optical system includes a lens member disposed closest to the to-be-inspected surface and having a concave surface facing the to-be-inspected surface.

[Note B6]

The inspection method according to any one of notes B2 to B5, further including bringing a contact member, which projects toward the to-be-inspected surface more than an optical member disposed closest to the to-be-inspected surface of optical members constituting the condensing optical system, into contact with the to-be-inspected surface.

[Note B7]

The inspection method according to note B6, wherein the contact member contacts at least a subregion on the to-be-inspected surface except the irradiation region.

[Note B8]

The inspection method according to note B6 or B7, wherein the contact member and the condensing optical system are disposed so that the distance in the direction of the optical axis of the condensing optical system between the condensing optical system and the to-be-inspected surface equals a working distance on the to-be-inspected surface side of the condensing optical system when the contact member contacts the to-be-inspected surface.

[Note B9]

The inspection method according to any one of notes B6 to B8, wherein the contact member supports at least the optical member disposed closest to the to-be-inspected surface so that the distance in the direction of the optical axis of the condensing optical system between the condensing optical system and the to-be-inspected surface equals a working distance on the to-be-inspected surface side of the condensing optical system when the contact member contacts the to-be-inspected surface.

[Note B10]

The inspection method according to any one of notes B2 to B9, wherein the light reflected by the irradiation region includes first reflected light reflected once by a region where the projections are not provided in the irradiation region, and second reflected light reflected twice by the projections and the region where the projections are not provided in the irradiation region.

[Note B11]

The inspection method according to note B10, wherein the condensing optical system includes a light-splitting member configured to reflect at least part of light from the light source toward the irradiation region, to transmit, toward the photodetector, a first portion of the first reflected light and the second reflected light that enter the condensing optical system from the irradiation region, and to prevent a second portion of the first reflected light different from the first portion from entering the photodetector.

[Note B12]

The inspection method according to note B11, wherein the light-splitting member reflects the second portion of the first reflected light in a direction different from the photodetector.

[Note B13]

The inspection method according to note B11 or B12, wherein the light-splitting member is configured so that the amount of the first portion of the first reflected light emitted from the light-splitting member is less than the amount of the second portion of the first reflected light emitted from the light-splitting member.

[Note B14]

The inspection method according to any one of notes B11 to B13, wherein the condensing optical system further includes a lens member that is disposed closest to the light-splitting member as viewed from the to-be-inspected surface and that has a concave surface facing the light-splitting member.

[Note B15]

The inspection method according to any one of notes B2 to B14, wherein the size in the photosensitive surface of a region of light flux that enters the condensing optical system from a point on the to-be-inspected surface at a maximum numerical aperture on the to-be-inspected surface side of the condensing optical system and that reaches the photodetector is at least 0.1 times the size of the photosensitive surface.

[Note B16]

The inspection method according to any one of notes B2 to B15, wherein the photosensitive surface is disposed closer to an exit pupil plane of the condensing optical system than an optical member disposed closest to the photodetector of optical members constituting the condensing optical system.

[Note B17]

The inspection method according to any one of notes B2 to B16, wherein the photosensitive surface is disposed on an exit pupil plane of the condensing optical system or a plane conjugate to the exit pupil plane.

[Note B18]

The inspection method according to any one of notes B2 to B17, wherein the projections each have a slope inclined with respect to a third direction perpendicular to the first direction and the second direction.

[Note B19]

The inspection method according to any one of notes B2 to B18, wherein the riblet structure is a structure for reducing frictional resistance between a fluid and the to-be-inspected surface.

[Note B20]

The inspection method according to any one of notes B2 to B19, wherein the condensing optical system satisfies the following conditional expression.

$$\gamma>\beta$$

where

β: the angle formed between a normal on the edge of the effective area of a lens surface disposed closest to the to-be-inspected surface in the condensing optical system and the optical axis of the condensing optical system γ: the maximum angle formed between a light beam received by the photodetector of light beams incident on a lens disposed closest to the to-be-inspected surface in the condensing optical system and the optical axis of the condensing optical system

[Note B21]

The inspection method according to any one of notes B2 to B20, wherein the condensing optical system satisfies the following conditional expression.

$$y<f \sin \theta$$

where y: the image height of the condensing optical system f: the focal length of the condensing optical system θ: the angle formed between the light reflected by the irradiation region and the optical axis of the condensing optical system

[Note B22]

The inspection method according to any one of notes B2 to B21, wherein the inspection includes inspecting the riblet structure, based on data indicating the intensity distribution outputted from the photodetector.

[Note B23]

The inspection method according to note B22, wherein the inspection includes determining the appropriateness of the shape of the projections, based on the data indicating the intensity distribution.

[Note B24]

The inspection method according to note B23, wherein the light reflected by the irradiation region includes first reflected light reflected once by a region where the projections are not provided in the irradiation region, and second reflected light reflected twice by the region where the projections are not provided in the irradiation region and the projections, and the inspection includes determining the appropriateness of the shape of the projections, based on the result of comparison between the intensities of the first reflected light incident on the photosensitive surface and the second reflected light incident on the photosensitive surface.

[Note B25]

The inspection method according to note B24, wherein the shape of the projections includes the roundness of the apexes of the projections.

[Note B26]

The inspection method according to any one of notes B23 to B25, wherein the light reflected by the irradiation region includes first reflected light reflected once by a region where the projections are not provided in the irradiation region, and second reflected light reflected twice by the region where the projections are not provided in the irradiation region and the projections, the second reflected light includes second reflected light reflected from the irradiation region in a second reflection direction different from a first reflection direction in which the first reflected light is reflected, and second reflected light reflected from the irradiation region in a third reflection direction different from the first reflection direction and the second reflection direction, and the inspection includes determining the appropriateness of the shape of the projections, based on the distance between the positions of entry into the photosensitive surface of the first reflected light and the second reflected light reflected in the second reflection direction, and the distance between the positions of entry into the photosensitive surface of the first reflected light and the second reflected light reflected in the third reflection direction.

[Note B27]

The inspection method according to note B26, wherein the projections each have a pair of slopes that inclines with respect to a third direction perpendicular to the first direction and the second direction, and that extends in the first direction, and the shape of the projections includes the symmetry of one slope and the other slope of the pair of slopes.

[Note B28]

The inspection method according to any one of notes B23 to B27, wherein the inspection includes determining the appropriateness of the shape of the projections by comparing the data indicating the intensity distribution outputted from the photodetector with at least one of at least one piece of non-defective standard data indicating intensity distribution of light reflected by irradiating the projections having a non-defective shape with light and at least one piece of defective standard data indicating intensity distribution of light reflected by irradiating the projections having a defective shape with light.

[Note B29]

The inspection method according to any one of notes B23 to B28, wherein the inspection includes determining the appropriateness of the shape of the projections by inputting the data indicating the intensity distribution outputted from the photodetector into a classifier that has been trained to determine the appropriateness of the shape of the projections.

[Note B30]

The inspection method according to any one of notes B23 to B29, wherein the inspection includes calculating a value related to the shape of the projections, based on the data indicating the intensity distribution outputted from the photodetector.

[Note B31]

The inspection method according to any one of notes B22 to B30, wherein the inspection includes inspecting the riblet structure by comparing the data indicating the intensity distribution outputted from the photodetector with prestored standard data of intensity distribution.

[Note B32]

The inspection method according to any one of notes B22 to B31, wherein the light reflected by the irradiation region includes first reflected light reflected once by a region where the projections are not provided in the irradiation region, and second reflected light reflected twice by the region where the projections are not provided in the irradiation region and the projections, and the inspection includes inspecting the riblet structure by determining whether the positions of the first reflected light and the second reflected light in the intensity distribution are respectively in prestored reference areas of the positions of the first reflected light and the second reflected light.

[Note B33]

A computer program for inspection, the computer program causing a computer to execute the inspection method according to any one of notes B1 to B32.

[Note C1]

An optical device for measuring a to-be-measured surface having a riblet structure in which projections each extending in a first direction are provided in a second direction intersecting the first direction, the optical device including:

a condensing optical system that irradiates an irradiation region on the to-be-measured surface with light from a light source and that condenses light reflected by the irradiation region; and a photodetector that is disposed on a plane different from a plane conjugate to the to-be-measured surface with respect to the condensing optical system, and that receives the light condensed by the condensing optical system.

[Note C2]

The optical device according to note C1, wherein the photodetector has a photosensitive surface disposed on the plane different from the conjugate plane, and detects intensity distribution of the light condensed by the condensing optical system.

[Note C3]

The optical device according to note C2, wherein the numerical aperture on the to-be-measured surface side of the condensing optical system is greater than or equal to 0.7.

[Note C4]

The optical device according to note C2 or C3, wherein the numerical aperture on the to-be-measured surface side of the condensing optical system is less than or equal to 0.9.

[Note C5]

The optical device according to any one of notes C2 to C4, wherein the condensing optical system includes a lens member disposed closest to the to-be-measured surface and having a concave surface facing the to-be-measured surface.

[Note C6]

The optical device according to any one of notes C2 to C5, further including a contact member projecting toward the to-be-measured surface more than an optical member disposed closest to the to-be-measured surface of optical members constituting the condensing optical system, the contact member being capable of contacting the to-be-measured surface.

[Note C7]

The optical device according to note C6, wherein the contact member is capable of contacting at least a subregion on the to-be-measured surface except the irradiation region.

[Note C8]

The optical device according to note C6 or C7, wherein the contact member and the condensing optical system are disposed so that the distance in the direction of the optical axis of the condensing optical system between the condensing optical system and the to-be-measured surface equals a working distance on the to-be-measured surface side of the condensing optical system when the contact member contacts the to-be-measured surface.

[Note C9]

The optical device according to any one of notes C6 to C8, wherein the contact member supports at least the optical member disposed closest to the to-be-measured surface so that the distance in the direction of the optical axis of the condensing optical system between the condensing optical system and the to-be-measured surface equals a working distance on the to-be-measured surface side of the condensing optical system when the contact member contacts the to-be-measured surface.

[Note C10]

The optical device according to any one of notes C2 to C9, wherein the light reflected by the irradiation region includes first reflected light reflected once by a region where the projections are not provided in the irradiation region, and second reflected light reflected twice by the projections and the region where the projections are not provided in the irradiation region.

[Note C11]

The optical device according to note C10, wherein the condensing optical system includes a light-splitting member configured to reflect at least part of light from the light source toward the irradiation region, to transmit, toward the photodetector, a first portion of the first reflected light and the second reflected light that enter the condensing optical system from the irradiation region, and to prevent a second portion of the first reflected light different from the first portion from entering the photodetector.

[Note C12]

The optical device according to note C11, wherein the light-splitting member reflects the second portion of the first reflected light in a direction different from the photodetector.

[Note C13]

The optical device according to note C11 or C12, wherein the light-splitting member is configured so that the amount of the first portion of the first reflected light emitted from the light-splitting member is less than the amount of the second portion of the first reflected light emitted from the light-splitting member.

[Note C14]

The optical device according to any one of notes C11 to C13, wherein the condensing optical system further includes a lens member that is disposed closest to the light-splitting member as viewed from the to-be-measured surface and that has a concave surface facing the light-splitting member.

[Note C15]

The optical device according to any one of notes C2 to C14, wherein the size in the photosensitive surface of a region of light flux that enters the condensing optical system from a point on the to-be-measured surface at a maximum numerical aperture on the to-be-measured surface side of the condensing optical system and that reaches the photodetector is at least 0.1 times the size of the photosensitive surface.

[Note C16]

The optical device according to any one of notes C2 to C15, wherein the photosensitive surface is disposed closer to an exit pupil plane of the condensing optical system than an optical member disposed closest to the photodetector of optical members constituting the condensing optical system.

[Note C17]

The optical device according to any one of notes C2 to C16, wherein the photosensitive surface is disposed on an exit pupil plane of the condensing optical system or a plane conjugate to the exit pupil plane.

[Note C18]

The optical device according to any one of notes C2 to C17, wherein the projections each have a slope inclined with respect to a third direction perpendicular to the first direction and the second direction.

[Note C19]

The optical device according to any one of notes C2 to C18, wherein the riblet structure is a structure for reducing frictional resistance between a fluid and the to-be-measured surface.

[Note C20]

The optical device according to any one of notes C2 to C19, wherein the condensing optical system satisfies the following conditional expression.

$$\gamma>\beta$$

where

β: the angle formed between a normal on the edge of the effective area of a lens surface disposed closest to the to-be-measured surface in the condensing optical system and the optical axis of the condensing optical system γ: the maximum angle formed between a light beam received by the photodetector of light beams incident on a lens disposed closest to the to-be-measured surface in the condensing optical system and the optical axis of the condensing optical system

[Note C21]

The optical device according to any one of notes C2 to C20, wherein the condensing optical system satisfies the following conditional expression.

$$y<f \sin \theta$$

where y: the image height of the condensing optical system f: the focal length of the condensing optical system θ: the angle formed between the light reflected by the irradiation region and the optical axis of the condensing optical system

[Note C22]

The optical device according to any one of notes C2 to C21, wherein the photodetector outputs data indicating intensity distribution of the light condensed by the condensing optical system on the photosensitive surface.

[Note C23]

The optical device according to note C22, further including a measurement unit that measures the riblet structure, based on the data indicating the intensity distribution outputted from the photodetector.

[Note C24]

The optical device according to note C23, wherein the measurement unit calculates a value related to the shape of the riblet structure, as measurement of the riblet structure, based on the data indicating the intensity distribution outputted from the photodetector.

[Note C25]

The optical device according to note C24, wherein the measurement unit calculates a value related to the shape of the riblet structure, based on the data indicating the intensity distribution outputted from the photodetector and pieces of shape standard data respectively indicating intensity distribution of light reflected by irradiating the riblet structures of different shapes with light.

[Note C26]

The optical device according to note C24 or C25, wherein the measurement unit outputs a value related to the shape of the riblet structure by inputting the data indicating the intensity distribution outputted from the photodetector into a classifier that has been trained to calculate a value related to the shape of the riblet structure.

[Note C27]

The optical device according to note C26, wherein the classifier includes a convolutional neural network having convolution layers connected in series from an input side toward an output side.

[Note C28]

The optical device according to any one of notes C24 to C27, wherein the measurement unit calculates, as the value, a value indicating at least one of the pitch in the second direction of the projections, the apical angle of the projections, the height of the projections, and the radius of curvature of apexes of the projection.

[Note C29]

The optical device according to any one of notes C23 to C28, wherein the light reflected by the irradiation region includes light reflected twice by the projections and a region where the projections are not provided in the irradiation region, the light reflected twice includes light reflected from the irradiation region in a first reflection direction, and light reflected from the irradiation region in a second reflection direction different from the first reflection direction, and the measurement unit calculates a value related to the shape of the riblet structure, based on the relationship between the positions of entry into the photosensitive surface of the light reflected in the first reflection direction and the light reflected in the second reflection direction.

[Note C30]

The optical device according to note C29, wherein the value related to the shape of the riblet structure is a value indicating the apical angle of the projections.

[Note C31]

The optical device according to any one of notes C23 to C30, wherein the measurement unit measures the riblet structure by comparing the data indicating the intensity distribution outputted from the photodetector with prestored standard data of intensity distribution.

[Note C32]

A measurement method for measurement of a riblet structure, based on data indicating the intensity distribution outputted from the optical device according to any one of notes C2 to C22.

[Note C33]

The measurement method according to note C32, wherein the measurement includes calculating a value related to the shape of the riblet structure, based on the data of the intensity distribution outputted from the optical device.

[Note C34]

The measurement method according to note C33, wherein the measurement includes calculating a value related to the shape of the riblet structure, based on the data of the intensity distribution outputted from the photodetector and pieces of shape standard data respectively indicating intensity distribution of light reflected by irradiating the riblet structures of different shapes with light.

[Note C35]

The measurement method according to note C33 or C34, wherein the measurement includes outputting a value related to the shape of the riblet structure by inputting the data of the intensity distribution into a classifier that has been trained to calculate a value related to the shape of the riblet structure.

[Note C36]

The measurement method according to note C35, wherein the classifier includes a convolutional neural network having convolution layers connected in series from an input side toward an output side.

[Note C37]

The measurement method according to any one of notes C33 to C36, wherein the measurement includes calculating, as the value, a value indicating at least one of the pitch in the second direction of the projections, the apical angle of the projections, the height of the projections, and the radius of curvature of apexes of the projection.

[Note C38]

The measurement method according to any one of notes C33 to C37, wherein the light reflected by the irradiation region includes light reflected twice by the projections and a region where the projections are not provided in the irradiation region, the light reflected twice includes light reflected from the irradiation region in a first reflection direction, and light reflected from the irradiation region in a second reflection direction different from the first reflection direction, and the measurement includes calculating a value related to the shape of the riblet structure, based on the relationship between the positions of entry into the photosensitive surface of the light reflected in the first reflection direction and the light reflected in the second reflection direction.

[Note C39]

The measurement method according to note C38, wherein the value related to the shape of the riblet structure is a value indicating the apical angle of the projections.

[Note C40]

The measurement method according to any one of notes C32 to C39, wherein the measurement includes measuring the riblet structure by comparing the data of the intensity distribution outputted from the photodetector with prestored standard data of intensity distribution.

[Note D1]

A measurement method for measuring a to-be-measured surface having a riblet structure in which projections each extending in a first direction are provided in a second direction intersecting the first direction, the measurement method including:

irradiating an irradiation region on the to-be-measured surface with light;

condensing, with a condensing optical system, light reflected by the irradiation region in response to irradiation with the light;

receiving the condensed light on a plane different from a plane conjugate to the to-be-measured surface with respect to the condensing optical system; and performing measurement of the riblet structure, based on the result of reception of light.

[Note D2]

The measurement method according to note D1, wherein in the reception of light, the condensed light is received by a photodetector having a photosensitive surface disposed on the plane different from the conjugate plane, and the photodetector detects intensity distribution of the condensed light as the result of reception of light.

[Note D3]

The measurement method according to note D2, wherein the numerical aperture on the to-be-measured surface side of the condensing optical system is greater than or equal to 0.7.

[Note D4]

The measurement method according to note D2 or D3, wherein the numerical aperture on the to-be-measured surface side of the condensing optical system is less than or equal to 0.9.

[Note D5]

The measurement method according to any one of notes D2 to D4, wherein the condensing optical system includes a lens member disposed closest to the to-be-measured surface and having a concave surface facing the to-be-measured surface.

[Note D6]

The measurement method according to any one of notes D2 to D5, further including bringing a contact member, which projects toward the to-be-measured surface more than an optical member disposed closest to the to-be-measured surface of optical members constituting the condensing optical system, into contact with the to-be-measured surface.

[Note D7]

The measurement method according to note D6, wherein the contact member contacts at least a subregion on the to-be-measured surface except the irradiation region.

[Note D8]

The measurement method according to note D6 or D7, wherein the contact member and the condensing optical system are disposed so that the distance in the direction of the optical axis of the condensing optical system between the condensing optical system and the to-be-measured surface equals a working distance on the to-be-measured surface side of the condensing optical system when the contact member contacts the to-be-measured surface.

[Note D9]

The measurement method according to any one of notes D6 to D8, wherein the contact member supports at least the optical member disposed closest to the to-be-measured surface so that the distance in the direction of the optical axis of the condensing optical system between the condensing optical system and the to-be-measured surface equals a working distance on the to-be-measured surface side of the condensing optical system when the contact member contacts the to-be-measured surface.

[Note D10]

The measurement method according to any one of notes D2 to D9, wherein the light reflected by the irradiation region includes first reflected light reflected once by a region where the projections are not provided in the irradiation region, and second reflected light reflected twice by the projections and the region where the projections are not provided in the irradiation region.

[Note D11]

The measurement method according to note D10, wherein the condensing optical system includes a light-splitting member configured to reflect at least part of light from the light source toward the irradiation region, to transmit, toward the photodetector, a first portion of the first reflected light and the second reflected light that enter the condensing optical system from the irradiation region, and to prevent a second portion of the first reflected light different from the first portion from entering the photodetector.

[Note D12]

The measurement method according to note D11, wherein the light-splitting member reflects the second portion of the first reflected light in a direction different from the photodetector.

[Note D13]

The measurement method according to note D11 or D12, wherein the light-splitting member is configured so that the amount of the first portion of the first reflected light emitted from the light-splitting member is less than the amount of the second portion of the first reflected light emitted from the light-splitting member.

[Note D14]

The measurement method according to any one of notes D11 to D13, wherein the condensing optical system further includes a lens member that is disposed closest to the light-splitting member as viewed from the to-be-measured surface and that has a concave surface facing the light-splitting member.

[Note D15]

The measurement method according to any one of notes D2 to D14, wherein the size in the photosensitive surface of a region of light flux that enters the condensing optical system from a point on the to-be-measured surface at a maximum numerical aperture on the to-be-measured surface side of the condensing optical system and that reaches the photodetector is at least 0.1 times the size of the photosensitive surface.

[Note D16]

The measurement method according to any one of notes D2 to D15, wherein the photosensitive surface is disposed closer to an exit pupil plane of the condensing optical system than an optical member disposed closest to the photodetector of optical members constituting the condensing optical system.

[Note D17]

The measurement method according to any one of notes D2 to D16, wherein the photosensitive surface is disposed on an exit pupil plane of the condensing optical system or a plane conjugate to the exit pupil plane.

[Note D18]

The measurement method according to any one of notes D2 to D17, wherein the projections each have a slope inclined with respect to a third direction perpendicular to the first direction and the second direction.

[Note D19]

The measurement method according to any one of notes D2 to D18, wherein the riblet structure is a structure for reducing frictional resistance between a fluid and the to-be-measured surface.

[Note D20]

The measurement method according to any one of notes D2 to D19, wherein the condensing optical system satisfies the following conditional expression.

$$\gamma > \beta$$

where $\beta$: the angle formed between a normal on the edge of the effective area of a lens surface disposed closest to the to-be-measured surface in the condensing optical system and the optical axis of the condensing optical system $\gamma$: the maximum angle formed between a light beam received by the photodetector of light beams incident on a lens disposed closest to the to-be-measured surface in the condensing optical system and the optical axis of the condensing optical system

[Note D21] The measurement method according to any one of notes D2 to D20, wherein the condensing optical system satisfies the following conditional expression.

$$y < f \sin \theta$$

where y: the image height of the condensing optical system f: the focal length of the condensing optical system θ: the angle formed between the light reflected by the irradiation region and the optical axis of the condensing optical system

[Note D22]

The measurement method according to any one of notes D2 to D21, wherein the measurement includes measuring the riblet structure, based on data indicating the intensity distribution outputted from the photodetector.

[Note D23]

The measurement method according to note D22, wherein the measurement includes calculating a value related to the shape of the riblet structure, based on the data of the intensity distribution outputted from the photodetector.

[Note D24]

The measurement method according to note D23, wherein the measurement includes calculating a value related to the shape of the riblet structure, based on the data of the intensity distribution outputted from the photodetector and pieces of shape standard data respectively indicating intensity distribution of light reflected by irradiating the riblet structures of different shapes with light.

[Note D25]

The measurement method according to note D23 or D24, wherein the measurement includes outputting a value related to the shape of the riblet structure by inputting the data of the intensity distribution into a classifier that has been trained to calculate a value related to the shape of the riblet structure.

[Note D26]

The measurement method according to note D25, wherein the classifier includes a convolutional neural network having convolution layers connected in series from an input side toward an output side.

[Note D27]

The measurement method according to any one of notes D23 to D26, wherein the measurement includes calculating, as the value, a value indicating at least one of the pitch in the second direction of the projections, the apical angle of the projections, the height of the projections, and the radius of curvature of apexes of the projection.

[Note D28]

The measurement method according to any one of notes D23 to D27, wherein the light reflected by the irradiation region includes light reflected twice by the projections and a region where the projections are not provided in the irradiation region, the light reflected twice includes light reflected from the irradiation region in a first reflection direction, and light reflected from the irradiation region in a second reflection direction different from the first reflection direction, and the measurement includes calculating a value related to the shape of the riblet structure, based on the relationship between the positions of entry into the photosensitive surface of the light reflected in the first reflection direction and the light reflected in the second reflection direction.

[Note D29]

The measurement method according to note D28, wherein the value related to the shape of the riblet structure is a value indicating the apical angle of the projections.

[Note D30]

The measurement method according to any one of notes D22 to D29, wherein the measurement includes measuring the riblet structure by comparing the data of the intensity distribution outputted from the photodetector with prestored standard data of intensity distribution.

[Note D31]

A computer program for measurement, the computer program causing a computer to execute the measurement method according to any one of notes D1 to D30.

It should be noted that those skilled in the art can make various changes, substitutions, and modifications without departing from the spirit and scope of the present disclosure.

REFERENCE SIGNS LIST

1 optical device
LS light source
2 condensing optical system
21 lens group
22 light-splitting member
3 photodetector
**3*a*** photosensitive surface
4 housing
**4*a*** contact member
5 computer
531 operation unit
532 detection unit
533 measurement unit

The invention claimed is:

1. An optical device for inspecting a to-be-inspected surface having a riblet structure in which projections each extending in a first direction are provided in a second direction intersecting the first direction, the optical device comprising:

a condensing optical system;

a photodetector that has a photosensitive surface disposed on a plane different from a plane conjugate to the to-be-inspected surface with respect to the condensing optical system; and a processor, wherein light from a light source irradiates an irradiation region on the to-be-inspected surface through the condensing optical system, light irradiating the irradiation region on the to-be-inspected surface and reflected by the irradiation region is condensed by the condensing optical system and detected by the photodetector, and the processor is configured to determine an appropriateness of a shape of the projections, based on intensities of (i) first reflected light reflected once by a region where the projections are not provided in the irradiation region and detected by the photodetector, and (ii) second reflected light reflected twice by the projections and the region where the projections are not provided in the irradiation region and detected by the photodetector.

2. The optical device according to claim 1, wherein a numerical aperture on a to-be-inspected surface side of the condensing optical system is greater than or equal to 0.7.

3. The optical device according to claim 1, wherein a numerical aperture on a to-be-inspected surface side of the condensing optical system is less than or equal to 0.9.

4. The optical device according to claim 1, wherein the condensing optical system comprises a first lens member having a concave surface facing the to-be-inspected surface, and the first lens member is disposed closest to the to-be-inspected surface among lens components included in the condensing optical system.

5. The optical device according to claim 1, further comprising a contact member projecting toward the to-be-inspected surface more than an optical member disposed closest to the to-be-inspected surface among optical members constituting the condensing optical system, the contact member being configured to contact the to-be-inspected surface.

6. The optical device according to claim 5, wherein the contact member is configured to contact at least a subregion on the to-be-inspected surface except the irradiation region.

7. The optical device according to claim 5, wherein the contact member and the condensing optical system are disposed so that a distance in a direction of an optical axis of the condensing optical system between the condensing optical system and the to-be-inspected surface equals a working distance on a to-be-inspected surface side of the condensing optical system when the contact member contacts the to-be-inspected surface.

8. The optical device according to claim 5, wherein the contact member supports at least the optical member disposed closest to the to-be-inspected surface among the optical members constituting the condensing optical system so that a distance in a direction of an optical axis of the condensing optical system between the condensing optical system and the to-be-inspected surface equals a working distance on a to-be-inspected surface side of the condensing optical system when the contact member contacts the to-be-inspected surface.

9. The optical device according to claim 1, wherein the condensing optical system comprises a light-splitting member configured to reflect at least part of light from the light source toward the irradiation region, to transmit, toward the photodetector, a first portion of the first reflected light and the second reflected light that enter the condensing optical system from the irradiation region, and to prevent a second portion of the first reflected light different from the first portion from entering the photodetector.

10. The optical device according to claim 9, wherein the light-splitting member reflects the second portion of the first reflected light in a direction different from the photodetector.

11. The optical device according to claim 9, wherein the light-splitting member is configured so that an amount of the first portion of the first reflected light emitted from the light-splitting member is less than an amount of the second portion of the first reflected light emitted from the light-splitting member.

12. The optical device according to claim 9, wherein the condensing optical system comprises one or more lens members and the light-splitting member in order from a to-be-inspected surface side, and the one or more lens members include a lens member that is disposed closest to the light-splitting member as viewed from the to-be-inspected surface among the one or more lens members and that has a concave surface facing the light-splitting member.

13. The optical device according to claim 1, wherein a size in the photosensitive surface of a region of light flux that enters the condensing optical system from a point on the to-be-inspected surface at a maximum numerical aperture on a to-be-inspected surface side of the condensing optical system and that reaches the photodetector is at least 0.1 times a size of the photosensitive surface.

14. The optical device according to claim 1, wherein the photosensitive surface is disposed closer to an exit pupil plane of the condensing optical system than an optical member disposed closest to the photodetector among optical members constituting the condensing optical system.

15. The optical device according to claim 1, wherein the photosensitive surface is disposed on an exit pupil plane of the condensing optical system or a plane conjugate to the exit pupil plane.

16. The optical device according to claim 1, wherein the projections each have a slope inclined with respect to a third direction perpendicular to the first direction and the second direction.

17. The optical device according to claim 1, wherein the riblet structure is a structure for reducing frictional resistance between a fluid and the to-be-inspected surface.

18. The optical device according to claim 1, wherein the shape of the projections includes a roundness of the apexes of the projections.

19. The optical device according to claim 1, wherein the second reflected light includes second reflected light reflected from the irradiation region in a second reflection direction different from a first reflection direction in which the first reflected light is reflected, and second reflected light reflected from the irradiation region in a third reflection direction different from the first reflection direction and the second reflection direction, and the processor is configured to determine the appropriateness of the shape of the projections, based on a distance between positions of entry into the photosensitive surface of the first reflected light and the second reflected light reflected in the second reflection direction, and a distance between the positions of entry into the photosensitive surface of the first reflected light and the second reflected light reflected in the third reflection direction.

20. The optical device according to claim 19, wherein the projections each have a pair of slopes that inclines with respect to a third direction perpendicular to the first direction and the second direction, and that extends in the first direction, and the shape of the projections includes symmetry of one slope and the other slope of the pair of slopes.

21. The optical device according to claim 1, wherein the processor is configured to determine the appropriateness of the shape of the projections by comparing the first reflected light and the second reflected light detected by the photodetector with at least one of at least one piece of non-defective standard data indicating intensity distribution of light reflected by irradiating the projections having a non-defective shape with light and at least one piece of defective standard data indicating intensity distribution of light reflected by irradiating the projections having a defective shape with light.

22. The optical device according to claim 1, wherein the processor is configured to determine the appropriateness of the shape of the projections by inputting the first reflected light and the second reflected light detected by the photodetector into a classifier that has been trained to determine the appropriateness of the shape of the projections.

23. The optical device according to claim 1, wherein the processor is configured to calculate values related to the shape of the projections, based on the first reflected light and the second reflected light.

24. An inspection method for inspecting a to-be-inspected surface having a riblet structure in which projections each extending in a first direction are provided in a second direction intersecting the first direction, the inspection method comprising:

irradiating an irradiation region on the to-be-inspected surface with light;

condensing, with a condensing optical system, light reflected by the irradiation region in response to irradiation with the light;

receiving the condensed light by a photodetector disposed on a plane different from a plane conjugate to the to-be-inspected surface with respect to the condensing optical system; and inspecting the riblet structure by determining an appropriateness of a shape of the protections, based on intensities of (i) first reflected light reflected once by a region where the projections are not provided in the irradiation region and detected by the photodetector, and (ii) second reflected light reflected twice by the projections and the region where the projections are not provided in the irradiation region and detected by the photodetector.

25. The optical device according to claim 1, wherein the condensing optical system condenses the first reflected light reflected in a first reflection direction by the irradiation region and the second reflected light reflected in a second reflection direction different from the first reflection direction by the irradiation region, and the first reflected light and the second reflected light respectively enter different positions in the photosensitive surface of the photodetector via the condensing optical system.

26. The optical device according to claim 1, wherein the condensing optical system irradiates the irradiation region with a parallel light.

27. The optical device according to claim 1, wherein the condensing optical system satisfies the following conditional expression, $\gamma>\beta$ where $\beta$: the angle formed between a normal on the edge of the effective area of a lens surface disposed closest to the to-be-inspected surface among lens surfaces in the condensing optical system and the optical axis of the condensing optical system $\gamma$: the maximum angle formed between a light beam received by the photodetector of light beams incident on a lens disposed closest to the to-be-inspected surface in the condensing optical system and the optical axis of the condensing optical system.

28. The optical device according to claim 1, wherein the condensing optical system satisfies the following conditional expression, $y<f\sin\theta$ where $\gamma$: the radius of a circle circumscribing the area of light condensed on the photosensitive surface by the condensing optical system f: the focal length of the condensing optical system $\theta$: the angle formed between the light reflected by the irradiation region and the optical axis of the condensing optical system.

* * * * *